US008580885B2

(12) United States Patent
Ohta et al.

(10) Patent No.: US 8,580,885 B2
(45) Date of Patent: Nov. 12, 2013

(54) RUBBER COMPOSITION AND PNEUMATIC TIRE USING THE SAME

(75) Inventors: Fuminori Ohta, Kodaira (JP); Koji Masaki, Higashimurayama (JP); Keisuke Kidono, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 423 days.

(21) Appl. No.: 12/439,769

(22) PCT Filed: Sep. 4, 2007

(86) PCT No.: PCT/JP2007/067238
§ 371 (c)(1),
(2), (4) Date: Jun. 1, 2009

(87) PCT Pub. No.: WO2008/029814
PCT Pub. Date: Mar. 13, 2008

(65) Prior Publication Data
US 2010/0006199 A1    Jan. 14, 2010

(30) Foreign Application Priority Data

| Sep. 4, 2006 | (JP) | 2006-238804 |
| Sep. 4, 2006 | (JP) | 2006-238809 |
| Sep. 4, 2006 | (JP) | 2006-239361 |
| Sep. 4, 2006 | (JP) | 2006-239653 |
| Sep. 4, 2007 | (JP) | 2007-229304 |

(51) Int. Cl.
C08L 9/00    (2006.01)
C08L 9/06    (2006.01)
C08L 53/02   (2006.01)
B60C 1/00    (2006.01)

(52) U.S. Cl.
USPC ........... 524/571; 524/502; 524/516; 524/190; 524/80; 524/496

(58) Field of Classification Search
USPC ............... 524/190, 571, 502, 516, 80, 496
See application file for complete search history.

(56) References Cited

U.S. PATENT DOCUMENTS

| 5,959,039 | A  | * | 9/1999  | Yokoyama et al. | 525/236 |
| 6,135,180 | A  | * | 10/2000 | Nohara | 152/209.1 |
| 6,455,655 | B1 | * | 9/2002  | Colvin et al. | 526/329.2 |
| 6,472,464 | B1 |   | 10/2002 | Morita et al. | |
| 6,497,261 | B1 |   | 12/2002 | Fukushima et al. | |
| 2002/0049294 | A1 | * | 4/2002 | Shiina | 526/329.2 |
| 2005/0070672 | A1 | * | 3/2005 | Ozawa et al. | 525/331.9 |
| 2006/0052507 | A1 | * | 3/2006 | Minakoshi | 524/492 |
| 2008/0289740 | A1 | * | 11/2008 | Mori et al. | 152/450 |
| 2009/0054549 | A1 | * | 2/2009 | Miyoshi | 523/150 |

FOREIGN PATENT DOCUMENTS

| EP | 1 486 513 A1 | 12/2004 |
| JP | 60-255838 A | 12/1985 |
| JP | 62-207342 A | 9/1987 |
| JP | 06-049279 A | 2/1994 |
| JP | 7-118445 A | 5/1995 |
| JP | 7-118453 A | 5/1995 |
| JP | 07-233285 A | 9/1995 |
| JP | 8-333480 A | 12/1996 |
| JP | 09-194640 A | 7/1997 |
| JP | 09-316132 A | 12/1997 |
| JP | 10-053671 A | 2/1998 |
| JP | 11-029659 A | 2/1999 |
| JP | 2001-011237 A | 1/2001 |
| JP | 2001-287508 A | 10/2001 |
| JP | 2004-161898 A | 6/2004 |
| JP | 2004-238619 A | 8/2004 |
| JP | 2004-263098 A | 9/2004 |
| JP | 2005-023219 A | 1/2005 |
| JP | 2005-126604 A | 5/2005 |
| JP | 2005-336303 A | 12/2005 |
| JP | 2008-088423 A | 4/2008 |
| WO | WO2006/093048 | * 9/2006 |
| WO | WO2006/098103 | * 9/2006 |

OTHER PUBLICATIONS

Database WPI Week 200540 Thompson Scientific, London, GB AN 2005-389057 XP002551572.
Office Action issued on Nov. 2, 2011 from the People's Republic of China Patent Office in a counterpart Chinese Application No. 200780038860.
Office Action dated Jul. 30, 2012 from the People Republic of China in a counterpart Chinese Application No. 200780038860.2.
JP Office Action issued on Sep. 4, 2012 from the Japanese Patent Office in Japanese Application No. 2007-229596.
Japanese Office Action issued on Jul. 2, 2013 from Japanese Patent Office in Japanese Application No. 2007-229597 English Translation.

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

This invention provides a rubber composition highly balancing flexibility at a low temperature and a low rolling resistance, which is formed by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of not less than 2,000 but less than 150,000 and a filler (C) into a high-molecular weight rubber component (A) having a weight average molecular weight as measured without terminating by modification through a gel permeation chromatography and converted to polystyrene of not less than 150,000.

40 Claims, No Drawings

RUBBER COMPOSITION AND PNEUMATIC TIRE USING THE SAME

TECHNICAL FIELD

This invention relates to a rubber composition and a pneumatic tire using the rubber composition, and more particularly to a rubber composition highly balancing a low rolling resistance and a flexibility at a low temperature.

BACKGROUND ART

Recently, a low fuel consumption and a safety of an automobile are strongly demanded in connection with a worldwide effluent control of carbon dioxide associated with a growing interest in environmental problems. In order to cope with such a demand, it is required to reduce a rolling resistance and improve grip performances such as a wet performance, a dry performance and the like as to tire performances. As a means for reducing the rolling resistance of the tire, it is effective to use a rubber composition having a lower loss tangent (tan δ) and a low heat build-up as a rubber composition applied to a tread portion of the tire. It is known that a butadiene rubber traditionally and widely used in the tread portion of the tire or a styrene-butadiene copolymer rubber having a low styrene content and a low vinyl content is exbubbleent in the flexibility at a low temperature since it is low in the glass transition temperature (Tg) as compared with other synthetic rubbers.

However, when the butadiene rubber or the styrene-butadiene copolymer rubber having the low styrene content and the low vinyl content is used in the tread, since the loss tangent (tan δ) of such a rubber composition is low, there is a problem that sufficient gripping performances are hardly obtained.

As a means for obtaining the rubber composition having a low heat build-up, there are considered the decrease in an amount of a filler such as carbon black, silica or the like, the use of carbon black having a large particle size, and so on. In any cases, however, there cannot be avoided the deterioration of the reinforcing property, wear resistance and grip performance on a wet road surface of the rubber composition. As another means for obtaining the rubber composition having a low heat build-up, there are developed many techniques of improving the dispersibility of the filler in the rubber composition. Among them is most effective a method wherein a polymerization active site of a conjugated diene-based polymer obtained through an anionic polymerization with an alkyl lithium is modified by a functional group interactive with a filler (for example, see JP-B-H05-87530, JP-A-H06-49279 and JP-A-S62-207342). However, when the modified conjugated diene-based polymer is used as a rubber component, if a large amount of a softening agent, particularly aromatic oil is compounded, the effect of improving the dispersibility of the filler is not sufficiently developed and there is a problem that the workability, low heat build-up, fracture characteristics and wear resistance of the rubber composition cannot be sufficiently improved. There is also known a technique of providing an excellent flexibility at a low temperature while maintaining a processability, but the effect is not sufficient and at the same time the rolling resistance cannot be improved (for example, see JP-A-H10-53671).

On the other hand, as the rubber composition applied to the tread portion of the tire is preferable a rubber composition having a high storage elastic modulus (G') for ensuring the grip performance, so that it is demanded to develop a rubber composition having a low loss tangent (tan δ) and a high storage elastic modulus (G'). In this connection, as a means for improving the storage elastic modulus (G') of the rubber composition is known a method wherein an amount of carbon black compounded in the rubber composition is increased. However, when the amount of carbon black compounded in the rubber composition is increased, the storage elastic modulus (G') of the rubber composition can be improved, but the loss tangent (tan δ) of the rubber composition is simultaneously increased to deteriorate the low heat build-up of the rubber composition, and further the Mooney viscosity of the rubber composition is raised to cause a problem of deteriorating the processability. Although there is a method of adding a softening agent for improving the processability, the wear resistance and rolling resistance are deteriorated as mentioned above. Therefore, it is increasingly demanded to develop a rubber composition balancing the above conflicting performances.

Particularly, a rubber composition applied to a tread portion of a studless tire is generally required to ensure the flexibility at a low temperature (the term "low temperature" used herein means a temperature during the running on ice and snow and is around −20 to 0° C.), so that it is often one of setting an elastic modulus at a low temperature to a low level by using a polymer having a low glass transition temperature such as butadiene rubber (BR), natural rubber (NR) or the like. However, the rubber composition compounded with the polymer having the low glass transition temperature such as butadiene rubber (BR), natural rubber (NR) or the like is low in tan δ as mentioned above, so that it is difficult to impart sufficient grip performances to the tire. In general, there is a tendency that when the elastic modulus at a low temperature is decreased, an elastic modulus at a high temperature (the term "high temperature" used herein is a temperature affecting the handling during the normal running) is also decreased, so that there is a problem that sufficient grip performances can not be maintained at a high-temperature region in the conventional studless tires. In addition, a sufficient friction coefficient is not obtained on a wet road surface during the normal running, and hence in the studless tire using the above rubber composition it is difficult to improve grip performances on the wet road surface (wet performance) during the normal running.

On the other hand, there have been previously developed various techniques of improving a friction force of a tread rubber itself. As such a technique, for example, there is known a method wherein a rubber composition formed by compounding a foaming agent into a rubber component is used as a tread rubber and then bubbles are generated in a matrix composed of the rubber component by foaming in an adequate manner. For example, JP-A-H09-194640 discloses a method of compounding a foaming agent and a liquid polymer having a weight average molecular weight of several tens of thousands into a rubber component as a technique of improving a wet performance and a grip performance on ice and snow (on-ice performance). However, the surface of the tread rubber obtained by this method is covered with a large number of pores, so that a dewatering effect and an edge effect on the ice and snow road surface can be developed to increase the friction force, while there is a problem that a fracture strength of the tire is deteriorated because the surface is covered with a large number of pores.

DISCLOSURE OF THE INVENTION

The inventors have made examinations and found that the wet performance is improved when using the liquid polymer described in JP-A-H09-194640 but the flexibility at the low temperature is deteriorated when using a liquid polymer having a relatively high glass transition temperature, so that the glass transition temperature of the liquid polymer used is limited to be relatively low. Therefore, there is still a room for improving the on-ice performance of the tire even if the technique disclosed in JP-A-H09-194640 is applied.

It is, therefore, an object of the invention to solve the above-mentioned problems of the conventional techniques and to provide a rubber composition highly balancing a flexibility at a low temperature and a low rolling resistance. Also, it is another object of the invention to provide a rubber composition capable of imparting exbubbleent on-ice performance and wet performance to a tire by using in at least a ground contact region of a tread portion of the tire. Further, it is the other object of the invention to provide a rubber composition capable of imparting a fracture strength while retaining a storage elastic modulus (G') at a high temperature but also improving a grip performance on ice and snow (on-ice performance) of the tire by using in at least a ground contact region of a tread portion of the tire. Moreover, it is a further object of the invention to provide a pneumatic tire using such a rubber composition.

The inventors have made various studies in order to achieve the above objects and discovered that the flexibility at a low temperature and the low rolling resistance of the rubber composition can be highly balanced by using a low-molecular weight conjugated diene-based polymer having at least one functional group and a weight average molecular weight of a specified range as a part of a softening agent and compounding into a high-molecular weight rubber component having a specified weight average molecular weight, and as a result the invention has been accomplished.

Also, the inventors have made further studies and discovered that when a low-molecular weight conjugated diene-based polymer having at least one functional group and a specified weight average molecular weight is compounded into a specified rubber component and expandable bubbles are included in a rubber matrix, a storage elastic modulus (G') at a low temperature of the resulting rubber composition can be largely lowered without largely lowering a storage elastic modulus (G') at a high temperature, whereby an on-ice performance can be enhanced and further a wet performance can be maintained since tan δ at the low temperature is not largely damaged, and as a result the invention has been accomplished. Further, the inventors have discovered that when the weight average molecular weight of the low-molecular weight conjugated diene-based polymer is selected and limited to a specified range, (1) the on-ice performance of the tire can be largely improved, or (2) the fracture strength of the resulting rubber composition is increased and the storage elastic modulus (G') at the high temperature is improved but also the storage elastic modulus (G') at the low temperature can be lowered.

That is, the first rubber composition according to the invention is characterized by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of not less than 2,000 but less than 150,000 and a filler (C) into a high-molecular weight rubber component (A) having a weight average molecular weight as measured without terminating by modification through a gel permeation chromatography and converted to polystyrene of not less than 150,000.

Also, the second rubber composition according to the invention is a rubber composition formed by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of not less than 2,000 and 150,000 into a rubber component (A) composed of at least one of natural rubber and synthetic diene-based rubbers having a weight average molecular weight as measured without terminating by modification through a gel permeation chromatography and converted to polystyrene of not less than 150,000, characterized in that bubbles are contained in a rubber matrix of the rubber composition.

Further, the third rubber composition according to the invention is characterized in that the low-molecular weight conjugated diene-based polymer (B) in the second rubber composition has a weight average molecular weight as measured without terminating by modification through a gel permeation chromatography and converted to polystyrene of 2,000 to 50,000. In addition, the fourth rubber composition according to the invention is characterized in that the low-molecular weight conjugated diene-based polymer (B) in the second rubber composition has a weight average molecular weight as measured without terminating by modification through a gel permeation chromatography and converted to polystyrene of 50,000 to 150,000.

Moreover, the term of "measured without terminating by modification" means that a polymer is obtained by quenching an active terminal with a terminator such as an alcohol or the like without conducting a modification reaction through the addition of a modifying agent or a coupling reaction of high-molecular weight forms which generates a molecular weight jumping and the like after the completion of the polymerization reaction and then the measurement is carried out on the polymer. This is true when a functional group containing nitrogen or the like is included in an initiator.

In a preferable embodiment of the third rubber composition according to the invention, a chloroform extractability as extracted with chloroform for 48 hours after vulcanization is not less than 60% by mass based on mass of the low-molecular weight conjugated diene-based polymer (B).

In a preferable embodiment of the fourth rubber composition according to the invention, a chloroform extractability as extracted with chloroform for 48 hours after vulcanization is not more than 60% by mass based on mass of the low-molecular weight conjugated diene-based polymer (B).

Any one of the first to fourth rubber compositions according to the invention is preferable to contain 1 to 60 parts by mass of the low-molecular weight conjugated diene-based polymer (B) based on 100 parts by mass of the rubber component (A).

In a preferable embodiment of any one of the first to fourth rubber compositions according to the invention, the low-molecular weight conjugated diene-based polymer (B) has a vinyl bond content in a conjugated diene compound portion of 5 to 80% by mass.

In another preferable embodiment of any one of the first to fourth rubber compositions according to the invention, the low-molecular weight conjugated diene-based polymer (B) is a butadiene homopolymer or a styrene-butadiene copolymer.

In the other preferable embodiment of any one of the first to fourth rubber compositions according to the invention, the functional group of the low-molecular weight conjugated diene-based polymer (B) is at least one selected from the group consisting of a tin-containing functional group, a silicon-containing functional group and a nitrogen-containing functional group. At this moment, the low-molecular weight conjugated diene-based polymer (B) is preferable to be one formed by modifying a polymerization active site with a tin-containing compound, a silicon-containing compound or a nitrogen-containing compound. Also, the tin-containing compound or the silicon-containing compound is more preferable to be a modification terminator represented by the following formula (I):

[wherein $R^1$ is independently selected from the group consisting of an alkyl group having a carbon number of 1 to 20, a cycloalkyl group having a carbon number of 3 to 20, an aryl group having a carbon number of 6 to 20 and an aralkyl group having a carbon number of 7 to 20; Z is tin or silicon; X is independently chlorine or bromine; a is 0-3 and b is 1-4 provided that a+b=4].

In any one of the first to fourth rubber compositions according to the invention, when the functional group of the low-molecular weight conjugated diene-based polymer (B) is at least one selected from the group consisting of a tin-containing functional group, a silicon-containing functional group and a nitrogen-containing functional group, the nitrogen-containing functional group is preferable to be selected from the group consisting of a substituted amino group represented by the following formula (II):

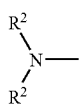

[wherein $R^2$ is independently an alkyl group having a carbon number of 1 to 12, a cycloalkyl group or an aralkyl group] and a cyclic amino group represented by the following formula (III):

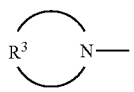

[wherein $R^3$ is an alkylene group having 3-16 methylene groups, a substituted alkylene group, an oxyalkylene group or an N-alkylamino-alkylene group]. Also, the silicon-containing functional group is preferable to be a functional group derived from a hydrocarbyloxy silane.

In the first rubber composition according to the invention, the low-molecular weight conjugated diene-based polymer (B) is preferable to have a weight average molecular weight as measured without terminating by modification through a gel permeation chromatography and converted to polystyrene of not less than 20,000 but less than 150,000, more preferably 50,000 to 120,000.

In the third rubber composition according to the invention, the low-molecular weight conjugated diene-based polymer (B) is preferable to have a weight average molecular weight as measured without terminating by modification through a gel permeation chromatography and converted to polystyrene of 2,000 to 30,000.

In the fourth rubber composition according to the invention, the low-molecular weight conjugated diene-based polymer (B) is preferable to have a weight average molecular weight as measured without terminating by modification through a gel permeation chromatography and converted to polystyrene of 50,000 to 120,000.

In another preferable embodiment of any one of the first to fourth rubber compositions according to the invention, the filler (C) is further contained in an amount of 20 to 100 parts by mass based on 100 parts by mass of the rubber component (A). At this moment, any one of the first to fourth rubber compositions according to the invention is preferable to contain 30 to 90 parts by mass of the filler (C) based on 100 parts by mass of the rubber composition (A). Also, the filler (C) is preferable to be carbon black and/or silica.

In the other preferable embodiment of any one of the first to fourth rubber compositions according to the invention, silica is contained in an amount of not less than 10 parts by mass based on 100 parts by mass of the rubber component (A).

In another preferable embodiment of the first rubber composition according to the invention, the rubber component (A) comprises at least one selected from the group consisting of an aromatic vinyl compound-conjugated diene compound copolymer (D), a conjugated diene compound polymer (E) and natural rubber. At this moment, a styrene-butadiene copolymer is preferable as the aromatic vinyl compound-conjugated diene compound copolymer (D), and a butadiene homopolymer is preferable as the conjugated diene compound polymer (E). Also, the aromatic vinyl compound-conjugated diene compound copolymer (D) and the conjugated diene compound polymer (E) are preferable to have at least one functional group. Further, the functional group in the aromatic vinyl compound-conjugated diene compound copolymer (D) and the conjugated diene compound polymer (E) is more preferable to be at least one selected from the group consisting of a tin-containing functional group, a silicon-containing functional group and a nitrogen-containing functional group.

In another preferable embodiment of any one of the first to fourth rubber compositions according to the invention, a total amount of the low-molecular weight conjugated diene-based polymer (B) and a softening agent (F) is 5 to 80 parts by mass based on 100 parts by mass of the rubber component (A). At this moment, the total amount of the low-molecular weight conjugated diene-based polymer (B) and the softening agent (F) compounded is preferable to be 5 to 60 parts by mass based on 100 parts by mass of the rubber component (A). Also, a proportion of the low-molecular weight conjugated diene-based polymer (B) in total of the low-molecular weight conjugated diene-based polymer (B) and the softening agent (F) is preferable to be not less than 20% by mass.

In any one of the second to fourth rubber compositions according to the invention, a ratio of bubbles in the rubber composition is preferable to be 5 to 35%.

In another preferable embodiment of any one of the second to fourth rubber compositions according to the invention, a foaming agent (G) is further contained in the rubber component (A). At this moment, any one of the second to fourth rubber compositions according to the invention is preferable to be formed by compounding 1 to 20 parts by mass of the foaming agent (G) based on 100 parts by mass of the rubber component (A), and then vulcanizing and foaming. Also, the foaming agent (G) is preferable to be at least one selected from the group consisting of azodicarbonamide, dinitrosopentamethylenetetramine, azobisisobutylonitrile, toluenesulfonyl hydrazide and a toluenesulfonyl hydrazide derivative.

The rubber composition according to the invention is preferable to be a rubber composition for a tire.

The first pneumatic tire according to the invention is characterized by using the aforementioned rubber composition for the tire in a tire member. As the tire member are preferably mentioned a tread portion, a sidewall portion, a bead filler portion, a body ply skim portion and a reinforcing rubber portion for a run-flat tire.

The second pneumatic tire according to the invention is characterized by using the aforementioned rubber composition for the tire in at least a ground contact region of a tread portion. At this moment, the second pneumatic tire is preferable to be a studless tire, more preferably a studless tire for a passenger car.

According to the invention, there can be provided a rubber composition highly balancing a flexibility at a low temperature and a low rolling resistance by compounding a low-molecular weight conjugated diene-based polymer having at least one functional group and specified weight average molecular weight and aromatic vinyl compound content into a high-molecular weight rubber component having a specified weight average molecular weight.

Also, there can be provided a rubber composition formed by compounding a low-molecular weight conjugated diene-based polymer having at least one functional group and specified weight average molecular weight and aromatic vinyl compound content into a rubber component having a specified weight average molecular weight and containing bubbles in a rubber matrix, and being capable of improving a grip performance on ice and snow (on-ice performance) without damaging a grip performance on a wet road surface (wet performance) during the normal running. Further, there can be provided (1) a rubber composition capable of imparting excellent on-ice performance and wet performance to a tire or (2) a rubber composition capable of imparting a fracture strength while retaining a storage elastic modulus (G') at a high temperature but also improving a grip performance on ice and snow (on-ice performance) of a tire by limiting the weight average molecular weight of the low-molecular weight conjugated diene-based polymer to a further specified range.

Moreover, there can be provided a pneumatic tire using the above rubber composition.

BEST MODE FOR CARRYING OUT THE INVENTION

The invention will be described in detail below. The first rubber composition according to the invention is characterized by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of not less than 2,000 and less than 150,000 and a filler (C) into a high-molecular weight rubber component (A) having a weight average molecular weight as measured without terminating by modification through a gel permeation chromatography and converted to polystyrene of not less than 150,000.

The second rubber composition according to the invention is a rubber composition formed by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of not less than 2,000 and 150,000 into a rubber component (A) composed of at least one of natural rubber and synthetic diene-based rubbers having a weight average molecular weight as measured without terminating by modification through a gel permeation chromatography and converted to polystyrene of not less than 150,000, characterized in that bubbles are contained in a rubber matrix of the rubber composition.

The second rubber composition according to the invention contains bubbles in its rubber matrix, so that the on-ice performance and wet performance are high by the dewatering effect and edge effect on the ice and snow road surface. In addition, the second rubber composition according to the invention includes the low-molecular weight conjugated diene-based polymer having a functional group introduced and a specified weight average molecular weight, so that it is high in the affinity with a filler such as silica or the like and the dispersibility of the filler is improved. For this end, in the second rubber composition according to the invention are improved physical properties such as fracture characteristics, the decrease in G' and so on.

The third rubber composition according to the invention is a rubber composition formed by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of 2,000 to 50,000 into a rubber component (A) composed of at least one of natural rubber and synthetic diene-based rubbers having a weight average molecular weight as measured without terminating by modification through a gel permeation chromatography and converted to polystyrene of not less than 150,000, characterized in that bubbles are contained in a rubber matrix of the rubber composition.

The third rubber composition according to the invention contains bubbles in its rubber matrix, so that the on-ice performance and wet performance are high by the dewatering effect and edge effect on the ice and snow road surface. In addition, the low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of 2,000 to 50,000 is applied to the third rubber composition according to the invention, whereby the dispersibility of the filler is improved to improve fracture characteristics, and further the grip performance on ice and snow (on-ice performance) can be largely improved since the storage elastic modulus (G') at −20° C. is lowered. Moreover, it can be confirmed from the results of measuring the temperature dispersion of the storage elastic modulus (G') that the effect of reducing the storage elastic modulus (G') in a low-temperature region, which affects the wet performance or on-ice performance, becomes remarkable as compared with a temperature region around 50° C. exerting on the handling during the normal running except for the running on ice and snow. Also, the rubber composition formed by compounding the low-molecular weight conjugated diene-based polymer (B) into a specified rubber component (A) has a high wet performance owing to the effect inherent to the liquid polymer. Therefore, by using the rubber composition according to the invention in at least a ground contact region of a tread portion of a pneumatic tire can be largely improved both of the on-ice performance and the wet performance.

The fourth rubber composition according to the invention is a rubber composition formed by compounding a low-molecular weight conjugated diene-based polymer (B) having at least one functional group, an aromatic vinyl compound content of less than 5% by mass and a weight average molecular weight as measured without terminating by modification through a gel permeation chromatography and converted to polystyrene of not less than 50,000 but less than 150,000 into a rubber component (A) composed of at least one of natural rubber and synthetic diene-based rubbers having a weight average molecular weight as measured without terminating by modification through a gel permeation chromatography and converted to polystyrene of not less than 150,000, characterized in that bubbles are contained in a rubber matrix of the rubber composition.

The fourth rubber composition according to the invention contains bubbles in its rubber matrix, so that the on-ice performance and wet performance are high owing to the dewatering effect and edge effect on the ice and snow road surface. Also, in the fourth rubber composition according to the invention is used the low-molecular weight conjugated diene-based polymer (B) having a weight average molecular weight as measured without terminating by modification through a gel permeation chromatography and converted to polystyrene of not less than 50,000 but less than 150,000 instead of a softening agent such as an aromatic oil or the like, so that a storage elastic modulus (G') at a high temperature and a fracture strength can be improved because the low-molecular weight conjugated diene-based polymer (B) has a certain molecular weight different from the common softening agent. On the other hand, since the low-molecular weight conjugated diene-based polymer (B) has carbon-carbon double bonds in its molecule, it is high in the affinity with a filler such as carbon black or the like and the dispersibility of the filler is improved. For this end, the fourth rubber composition according to the invention can suppress the rising of a storage elastic modulus (G') at a low temperature to highly maintain the on-ice performance. Moreover, since the rubber composition is low in tan δ at a high temperature, when the rubber composition is used in at least a ground contact region of a tire tread portion, the tire has a low rolling resistance and an exbubbleent fuel consumption.

The rubber component (A) used in the first to fourth rubber compositions according to the invention is a high-molecular weight rubber component, which is required to have a weight average molecular weight as measured without terminating by modification through a get permeation chromatography and converted to polystyrene of not less than 150,000, preferably 200,000 to 2,000,000. When the weight average molecular weight of the rubber component (A) is within the above range, if it is compounded with the low-molecular weight conjugated diene-based polymer (B), the decrease of the Mooney viscosity and the deterioration of the fracture characteristics and wear resistance can be suppressed to obtain the excellent processability. Also, the rubber component (A) is preferable to comprise at least one selected from the group consisting of an aromatic vinyl compound-conjugated diene compound copolymer (D), a conjugated diene compound polymer (E) and natural rubber.

The rubber component (A) used in the first rubber composition according to the invention is not particularly limited and may be selected from the group of the high-molecular weight rubber components including natural rubbers and an aromatic vinyl compound-conjugated diene compound copolymer (D) and a conjugated diene compound polymer (E) which are synthetic diene-based rubbers. As the rubber component (A) may be used any of unmodified and modified rubbers. Natural rubber and isoprene rubber (IR) are not particularly limited, and all of commercially available natural rubbers and isoprene rubbers may be used. Also, the aromatic vinyl compound-conjugated diene compound copolymer (D) is particularly preferable to be a styrene-butadiene copolymer. At this moment, as the conjugated diene compound are mentioned, for example, 1,3-butadiene, 1,3-pentadiene, isoprene, 1,3-hexadiene and so on. Among them, 1,3-butadiene is particularly preferable. On the other hand, as the aromatic vinyl compound used in the copolymerization with the conjugated diene compound are mentioned, for example, styrene, α-methylstyrene, 1-vinylnaphthalene, 3-vinyltoluene, ethylvinylbenzene, divinylbenzene, 4-cyclohexylstyrene, 2,2,6-tolylstyrene and so on. Among them, styrene is preferable. The conjugated diene compound polymer (E) includes a homopolymer of the conjugated diene compound, a copolymer of the conjugated diene compounds and the like, and it is preferable to be polybutadiene as a homopolymer of the conjugated diene compound. Natural rubber, the component (D) and the component (E) may be used alone or in a combination of two or more.

In the first rubber composition according to the invention, the conjugated diene-based polymer usable in the rubber component (A) (including the aromatic vinyl compound-conjugated diene compound copolymer (D) and the conjugated diene compound polymer (E)) can be produced by various methods such as emulsion polymerization, solution polymerization and the like. As a polymerization system may be used any of a batch polymerization system and a continuous polymerization system. A preferable production method includes as follows. That is, it is obtained by polymerizing monomer(s) including a conjugated diene compound in an inert solvent, preferably a hydrocarbon solvent in the presence of an initiator such as an organic metal or the like, preferably an organolithium compound or a lithium amide compound. The hydrocarbon solvent is not particularly limited and includes, for example, n-pentane, n-hexane, n-heptane, cyclohexane, benzene, toluene and the like. Among them, cyclohexane and n-hexane are preferable. These hydrocarbon solvents may be used alone or in a combination of two or more. The organolithium compound used as the initiator is preferable to be a hydrocarbon lithium compound or a lithium amide compound which has at least one lithium atom bonded and a carbon number of 2 to 20. For example, as the hydrocarbon lithium compound are mentioned n-butyl lithium, sec-butyl lithium, ethyl lithium, n-propyl lithium, tert-octyl lithium, phenyl lithium and the like, and N-butyl lithium is preferable. These organolithium compound initiators may be used alone or in a combination of two or more.

Further, the conjugated diene-based polymer as the components (D) and (E) used in the first rubber composition according to the invention is preferable to have at least one functional group, and it is more preferably a modified polymer having a tin-containing functional group or a silicon-containing functional group in its molecule or terminal, or a modified polymer having a nitrogen-containing functional group. It is preferable that these modified polymers suppress the decrease of the elastic modulus due to the rise of the temperature but also can suppress the heat build-up in a rubber composition compounded with carbon black in case of introducing a tin atom or a nitrogen atom, or in a rubber composition compounded with a reinforcing inorganic filler such as silica or the like in case of introducing a silicon atom. Moreover, in the component (D) or (E), the content of the polymer having at least one functional group of a tin-containing functional group, a nitrogen-containing functional group and a silicon-containing functional group in its molecule or terminal is preferably not less than 50% by mass, more preferably not less than 80% by mass.

Also, the components (D) and (E) are particularly preferable to have a branched structure. The branched structure can be introduced by using an initiator having a functionality of not less than three, a modifying agent having a functionality of not less than three, a monomer having a polymerization active group of not less than two or the like. It is preferable to use the modified agent having a functionality of not less than three. The above modified polymer is produced by a well-known method. Typically, it is obtained by starting polymerization with an organolithium initiator and then adding various modifying agents in a solution of a polymer having a lithium active terminal (see JP-B-H06-89183, JP-A-H11-29659 and the like). It is preferable to charge the modifying agent after the completion of the polymerization. A coupling agent is a halide such as tin halide, silicon halide or the like. A halogen in the coupling agent is generally fluorine, chlorine, bromine or iodine. Among them, chlorine is preferable. Also, tin or silicon atom of Group VIa is preferable, and tin is particularly preferable. For example, a tin atom can be introduced with a tin compound such as tin tetrachloride, tributyltin, dioctyltin dichloride, dibutyltin dichloride, triphenyltin chloride or the like.

The nitrogen atom can be introduced with an isocyanate compound such as 2,4-tolylene diisocyanate, diisocyanate diphenylmethane, MDI (including a commercially available one commonly known as crude MDI which is a mixture of analogs having the different number of nuclei) or the like; a thioisocyanate compound; an aminobenzophenone compound such as 4,4'-bis(diethylamino)-benzophenone, 4-(dimethylamino) benzophenone or the like; an urea derivative such as 1,3-dimethyl-2-imidazolidinone, 1,3-diethyl-2-imidazolidinone, 1,3-dimethyl-3,4,5,6-tetrahydropyrimidine or the like; or other nitrogen-containing compound, for example, a ketimine or aldimine compound having a C=N—C bond such as 4-dimethylaminobenzylidene aniline or the like, a cyclic amide compound such as N-methylpyrrolidone or the like. Also, it can be introduced by a reaction with a polymerizable vinyl compound or conjugated diene compound having a nitrogen-containing group such as 2-vinylpyridine, 4-(N,N-dimethylamino)methylstyrene or the like. Further, when a lithium amide compound is used as a polymerization initiator, a (co)polymer having a nitrogen-containing functional group at a polymerization starting terminal and a polymerization active site at another terminal can be obtained, so that the rubber component (A) having one functional group can be produced by reacting the (copolymer with a modification terminator without modification. As the lithium amide compound are mentioned lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide, N-lithio morpholine, N-methyl homopiperazine, N-ethyl homopiperazine, N-butyl homopiperazine and so on. Among them, cyclic lithium amide compounds such as lithium hexamethylene imide, lithium pyrrolidide, lithium piperidide, lithium heptamethylene imide, lithium dodecamethylene imide and the like are preferable, and lithium hexamethylene imide and lithium pyrrolidide are particularly preferable. In a preferable embodiment, the lithium amide compound is previously produced in the presence of a solubilized component (SOL) as disclosed in a patent (quote a SOL patent) or in the absence of the solubilized component as disclosed in a patent (quote a patent limiting an amine structure without SOL), and may be then used as a polymerization initiator. Moreover, the lithium amide compound can be produced in a polymerization system (in situ) without a preliminary adjustment to use as a polymerization initiator as disclosed in a patent (quote an InSitu patent).

The silicon atom can be introduced in any well-known methods wherein alkoxysilyl group or silanol group can be introduced, but there is preferable a method wherein when a specified hydrocarbyloxy silane compound (which contains C1-C20 alkoxysilyl group and/or allyloxysilyl group, and possibly C1-C20 hydrocarbylene group further bonded to a functional group such as epoxy group, amino group, ketimine group, amide group, carboxylic acid ester group, carbonic acid ester group, isocyanate group, thioisocyanate group, nitrile group or the like in the same molecule) is used as a modification terminator and reacted with a polymerization active terminal. The hydrocarbyloxy silane compound includes a compound formed by partially condensing the hydrocarbyloxy groups. The hydrocarbyloxy silane compound concretely includes, for example, a compound formed by bonding two to four C1-C20 hydrocarbyloxy groups to a silicon atom such as tetraethoxy silane, methyltriphenoxy silane or the like as an example of not containing another functional group except for hydrocarbon group. As an epoxy group-containing alkoxysilane compound are concretely mentioned 2-glycidoxyethyl trimethoxysilane, 2-glycidoxyethyl triethoxysilane, (2-glycidoxyethyl)methyl dimethoxysilane, (2-glycidoxyethyl)methyl diethoxysilane, 3-glycidoxypropyl trimethoxysilane, 3-glycidoxypropyl triethoxysilane, (3-glycidoxypropyl)methyl dimethoxysilane, (2-glycidoxypropyl)methyl diethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl (methyl) diethoxysilane, 2-(3,4-epoxycyclohexyl)ethyl (methyl) dimethoxysilane and the like.

As an amino group-containing alkoxysilane compound are mentioned a disubstituted amino group-containing hydrocarbyloxy silane compound such as 3-(N,N-dimethylamino)propyl(triethoxy) silane, 3-(N,N-dimethylamino)propyl(trimethoxy) silane, 3-(N,N-diethylamino)propyl(triethoxy) silane, 3-(N,N-diethylamino)propyl(trimethoxy) silane, 2-(N,N-dimethylamino)ethyl(triethoxy) silane, 2-(N,N-dimethylamino)ethyl(trimethoxy) silane, 3-(N,N-dimethylamino)propyl(diethoxy)methylsitane, 3-(N,N-dibutylamino)propyl(triethoxy) silane or the like; and a cyclic amino group-containing hydrocarbyloxy silane compound such as 3-(1-hexamethyleneimino)propyl(triethoxy) silane, 3-(1-hexamethyleneimino)propyl(trimethoxy) silane, 3-(1-hexamethyleneimino)propyl(diethoxy)methylsilane, (1-hexamethyleneimino)methyl(trimethoxy) silane, (1-hexamethyleneimino)methyl(triethoxy) silane, 2-(1-hexamethyleneimino)ethyl(triethoxy) silane, 2-(1-hexamethyleneimino)ethyl(trimethoxy) silane, 3-(1-pyrrolidinyl)propyl(triethoxy) silane, 3-(1-pyrrolidinyl) propyl (trimethoxy) silane, 3-(1-heptamethyleneimino) propyl(triethoxy) silane, 3-(1-dodecamethyleneimino) propyl(triethoxy) silane, 3-(1-hexamethyleneimino)propyl (diethoxy)methylsilane, 3-(1-hexamethyleneimino)propyl (diethoxy)ethylsilane, 1-[3-(triethoxysilyl)propyl]-4,5-dihydroimidazole, 1-[3-((diethoxy)methylsilyl)propyl]-4,5-dihydroimidazole, 1-[3-(trimethoxysilyl)propyl]-4,5-dihydroimidazole, 3-[10-(triethoxysilyl)decyl]-4-oxazoline or the like.

As an imino group-containing alkoxysilane are mentioned N-(1,3-dimethylbutylidene)-3-(triethoxysilyl)-1-propaneamine, N-(1,3-dimethylbutylidene)-3-(trimethoxysilyl)-1-propaneamine, N-(1,3-dimethylbutylidene)-3-(diethoxy (methyl)silyl)-1-propaneamine, N-(1,3-dimethylbutylidene)-3-(dimethoxy(methyl)silyl)-1- propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylatninobenzylidene)-3-(triethoxysilyl)-1-propaneamine, N-(cyclohexylidene)-3-(triethoxysilyl)-1-propaneamine and the like.

For example, as disclosed above, the modified polymer can be obtained by polymerizing with a lithium amide initiator obtained from an acyclic secondary amine compound such as diethylamine or the like or a cyclic secondary amine compound such as hexamethylene imine or the like and a organolithium compound, or further adding the modifying agent in a solution of a polymer having a lithium active terminal obtained by the polymerization. It is also preferable that the modified polymer having the functional group introduced in its molecular chain can suppress the decrease of the elastic modulus due to the temperature rise but also improve the dispersion state of the filler in the rubber composition compounded with carbon black or a reinforcing inorganic filler such as silica or the like to effectively improve the low heat build-up. Particularly, ones having the branched structure obtained by using a multifunctional modifying agent are preferable. Furthermore, the modified polymer wherein a tin atom or an organofunctional group such as epoxy group, amino group, ketimine groups amide group, isocyanate group, thioisocyanate group, nitrile group or the like is introduced with the alkoxysilyl group is effectively applied particularly when carbon black is used together with the inorganic filler such as silica or the like as the reinforcing filler.

The rubber component (A) used in the second to fourth rubber compositions according to the invention comprises at least one of natural rubber (NR) and synthetic diene-based rubbers. As the rubber component (A) may be used any of unmodified and modified rubbers. The synthetic diene-based rubber is preferable to be synthesized through emulsion polymerization or solution polymerization. As the synthetic diene-based rubber are concretely mentioned polyisoprene rubber (IR), styrene-butadiene copolymer rubber (SBR), polybutadiene rubber (BR), ethylene-propylene-diene rubber (EPDM), chloroprene rubber (CR), isobutylene isoprene rubber (IIR), halogenated butyl rubber, acrylonitrile-butadiene rubber (NBR) and so on. Natural rubber, polyisoprene rubber, styrene-butadiene copolymer rubber, polybutadiene rubber and isobutylene isoprene rubber are preferable as the rubber component (A). These rubber components (A) may be used alone or in a blend of two or more.

The rubber composition according to the invention is preferable to comprise 1 to 60 parts by mass, more preferably 3 to 50 parts by mass of the low-molecular weight conjugated diene-based polymer (B) based on 100 parts by mass of the rubber component (A). When the amount of the low-molecular weight conjugated diene-based polymer (B) compounded is less than 1 part by mass, the on-ice performance and wet performance of the tire can not be improved sufficiently, while when it exceeds 60 parts by mass, the fracture characteristics and wear resistance of the vulcanized rubber are deteriorated. In the first rubber composition according to the invention, the wet performance is maintained without damaging the processability and the low rolling resistance and dry performance can be improved by replacing a part of a softening agent with the low-molecular weight conjugated diene-based polymer and limiting the amount of the low-molecular weight conjugated diene-based polymer (B) compounded to the above range.

The low-molecular weight conjugated diene-based polymer (B) in the first rubber composition according to the invention is required to have a weight average molecular weight as measured without terminating by modification through a gel permeation chromatography (GPC) and converted to polystyrene of not less than 2,000 but less than 150,000. When the weight average molecular weight of the low-molecular weight conjugated diene-based polymer (B) is within the above range, there can be obtained a rubber composition maintaining the wet grip performance without damaging the processability and highly balancing the storage elastic modulus at the high temperature and the low rolling resistance. Moreover, from a viewpoint of improving the grip performance over a wide temperature range from a low temperature to a high temperature in addition to the various performances, it is preferable to be within a range of not less than 20,000 but less than 150,000, more preferably within a range of 50,000 to 120,000, even preferably within a range of 50,000 to 100,000.

Since the low-molecular weight conjugated diene-based polymer (B) in the first rubber composition according to the invention has at least one functional group and a weight average molecular weight as measured without terminating by modification through a gel permeation chromatography (GPC) and converted to polystyrene of not less than 2,000 but less than 150,000, the low rolling resistance, wear resistance and grip performances are improved together. In particular, when the weight average molecular weight of the component (B) is within a range of 2,000 to 50,000, preferably within a range of 2,000 to 30,000, the flexibility at the low temperature and wet performance can be highly maintained. Also, when the weight average molecular weight of the component (B) is within a range of not less than 50,000 but less than 150,000, preferably within a range of 50,000 to 120,000, the storage elastic modulus at the high temperature and low rolling resistance are particularly improved. Therefore, in case of emphasizing any performance of wet performance, dry performance and the intermediate performance thereof as the tire performance, the range of the weight average molecular weight of the component (B) can be selected depending on the performance emphasized.

The low-molecular weight conjugated diene-based polymer (B) in the first rubber composition according to the invention is required to have a weight average molecular weight as measured without terminating by modification through a gel permeation chromatography (GPC) and converted to polystyrene of not less than 2,000 but less than 150,000. When the weight average molecular weight as measured without terminating by modification through a gel permeation chromatography (GPC) and converted to polystyrene is within a range of 2,000 to 50,000, preferably 2,000 to 30,000, the flexibility at the low temperature and wet performance can be highly maintained, while when the weight average molecular weight as measured without terminating by modification and converted to polystyrene of the component (B) is within a range of not less than 50,000 but less than 150,000, preferably 50,000 to 120,000, the storage elastic modulus at the high temperature and low rolling resistance are particularly improved. Therefore, in case of emphasizing any performance of wet performance, dry performance and the intermediate performance thereof as the tire performance, the range of the weight average molecular weight of the component (B) can be selected depending on the performance emphasized.

The low-molecular weight conjugated diene-based polymer (B) in the third rubber composition according to the invention is required to have a weight average molecular weight as measured without terminating by modification through a gel permeation chromatography (GPC) and converted to polystyrene of 2,000 to 50,000, preferably 2,000 to 30,000, more preferably 2,000 to 20,000. When the rubber composition compounded with the low-molecular weight conjugated diene-based polymer (B) having the specified range of the weight average molecular weight as converted to polystyrene is used in at least a ground contact region of a tread portion of a tire, the wet performance can be improved. When the weight average molecular weight as measured without terminating by modification and converted to polystyrene of the low-molecular weight conjugated diene-based polymer (B) is less than 2,000, the fracture strength is deteriorated, while when it exceeds 50,000, the processability of the rubber composition is deteriorated. Moreover, when the low-molecular weight conjugated diene-based polymer (B) is a polymer modified with the modifying agent, the weight average molecular weight after the modification as measured through a gel permeation chromatography and converted to polystyrene is preferable to be around 2,000 to 300,000.

The low-molecular weight conjugated diene-based polymer (B) in the fourth rubber composition according to the invention is required to have a weight average molecular weight as measured without terminating by modification through a gel permeation chromatography (GPC) and converted to polystyrene of not less than 50,000 but less than 150,000, preferably 50,000 to 120,000. When the rubber composition compounded with the low-molecular weight conjugated diene-based polymer (B), having the specified range of the weight average molecular weight as converted to polystyrene is used in at least a ground contact region of a tread portion of a tire, the storage elastic modulus (G') at the high temperature and fracture strength can be improved. When the weight average molecular weight as converted to polystyrene is less than 50,000, the storage elastic modulus (G') of the rubber composition at the high temperature is lowered but also tan δ tends to rise, while when it is not less than 150,000, the workability of the rubber composition is deteriorated.

The low-molecular weight conjugated diene-based polymer (B) in the rubber composition according to the invention has at least one functional group in its molecule. At this moment, the low-molecular weight conjugated diene-based polymer (B) is preferable to have a tin-containing functional group, a silicon-containing functional group, a nitrogen-containing functional group or the like introduced by modifying with a modifying agent such as a tin-containing compound, a silicon-containing compound, a nitrogen-containing compound or the like. As the functional group introduced into the low-molecular weight conjugated diene-based polymer (B) is preferable a functional group having an affinity for a filler such as carbon black, silica or the like. The low-molecular weight conjugated diene-based polymer (B) becomes higher in the affinity for the filler owing to the presence of such a functional group as compared with the case not having the functional group. Thus, the dispersibility of the filler can be improved to largely improve the on-ice performance but also tan δ at the high temperature can be lowered to suppress the heat build-up of the rubber composition itself. Moreover, the storage elastic modulus (G') at −20° C. can be lowered by compounding the low-molecular weight conjugated diene-based polymer (B) having at least one functional group in its molecule into the rubber composition.

The low-molecular weight conjugated diene-based polymer (B) is not particularly limited, and produced, for example, by copolymerizing an aromatic vinyl compound and a conjugated diene compound as a monomer or by homopolymerizing a conjugated diene compound as a monomer. In particular, the polymer (B) can be produced by (1) a method wherein the monomer(s) is (co)polymerized with a polymerization initiator to produce a (co)polymer having a polymerization active site and then the polymerization active site is modified with various modifying agents, or (2) a method of (co)polymerizing the monomer(s) with a polymerization initiator having a functional group. Moreover, these methods may be used in combination. The (co)polymer having the polymerization active site may be produced through an anionic polymerization or a coordination polymerization. As the aromatic vinyl compound are mentioned styrene, p-methylstyrene, m-methylstyrene, p-tert-butyl styrene, α-methylstyrene, chloromethyl styrene, vinyl toluene and so on. Among them, styrene is preferable. On the other hand, as the conjugated diene compound are mentioned 1,3-butadiene, isoprene, 1,3-pentadiene, 2,3-dimethylbutadiene and so on. Among them, 1,3-butadiene is preferable.

The low-molecular weight conjugated diene-based polymer (B) is preferable to be a butadiene homopolymer as the homopolymer of the conjugated diene compound or a styrene-butadiene copolymer as the aromatic vinyl compound-conjugated diene compound copolymer. When the low-molecular weight conjugated diene-based polymer (B) is the butadiene homopolymer, since the glass transition temperature (Tg) is low, the flexibility at a low temperature is excellent and the on-ice performance is high. When the butadiene-based low-molecular weight polymer is used as a part of a softening agent such as an aromatic oil or the like and compounded into the composition according to the invention, it is possible to lower the storage elastic modulus (G') in the low-temperature region and increase the storage elastic modulus (G') in the high-temperature region and lower tan δ in the high-temperature region in connection with the low rolling resistance without raising the Mooney viscosity, and further the fracture characteristics are improved to improve the wear resistance.

The low-molecular weight conjugated diene-based polymer (B) is required to have an aromatic vinyl compound content of less than 5% by mass. When the aromatic vinyl compound content is less than 5% by mass, the storage elastic modulus (G') at a low temperature can be retained to a low level. Further, a polymer having a low glass transition temperature (Tg) can improve the wear resistance.

The low-molecular weight conjugated diene-based polymer (B) is preferable to have a vinyl bond content in a conjugated diene compound portion of 0 to 80% by mass, more preferably 5 to 80% by mass. When the vinyl bond content in the conjugated diene compound portion exceeds 80% by mass, the elastic modulus (particularly storage elastic modulus (G')) at the low temperature is largely raised to deteriorate the on-wet performance.

In case of producing a (co)polymer having the polymerization active site through the anionic polymerization, as the polymerization initiator is preferably used an alkali metal compound or an alkali metal amide compound, and more preferably a lithium compound. As the lithium compound are mentioned a hydrocarbyl lithium, a lithium amide compound and so on. When the hydrocarbyl lithium is used as the polymerization initiator, there is obtained a (co)polymer having a hydrocarbyl group at a polymerization starting terminal and a polymerization active site at another terminal. On the other hand, when the lithium amide compound is used as the polymerization initiator, there is obtained a (co)polymer having a nitrogen-containing functional group at a polymerization starting terminal and a polymerization active site at another terminal, which can be used as the polymer (B) in the invention even without being modified with the modifying agent. Moreover, the amount of the alkali metal compound or the alkali metal amide compound used as the polymerization initiator is preferably within a range of 0.2 to 100 mmol per 100 g of the monomer.

As the hydrocarbyl lithium are mentioned ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium and so on. Among them, alkyl lithiums such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

On the other hand, as the lithium amide compound are mentioned lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide, N-lithio morpholine, N-methyl homopiperazine, N-ethyl homopiperazine, N-butyl homopiperazine and so on. Among them, cyclic lithium amide compounds such as lithium hexamethylene imide, lithium pyrrolidide, lithium piperidide, lithium heptamethylene imide, lithium dodecamethylene imide and the like are preferable, and lithium hexamethylene imide and lithium pyrrolidide are particularly preferable. In a preferable embodiment, the lithium amide compound is previously produced in the presence of a solubilized component (SOL) as disclosed in a patent (quote a SOL patent) or in the absence of the solubilized component as disclosed in a patent (quote a patent limiting an amine structure without SOL), and then it may be used as the polymerization initiator. Moreover, the lithium amide compound can be produced in a polymerization system (in situ) without a preliminary adjustment to use as the polymerization initiator as disclosed in a patent (quote an InSitu patent).

The low-molecular weight conjugated diene-based polymer (B) with at least one nitrogen-containing functional group selected from the group consisting of the substituted amino group represented by the formula (II) and the cyclic amino group represented by the formula (III) introduced can be obtained by using a lithium amide compound represented by the substituted amino group represented by the following formula (II):

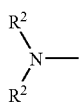

(II)

[wherein $R^2$ is independently an alkyl group having a carbon number of 1 to 12, a cycloalkyl group or an aralkyl group] or the cyclic amino group represented by the following formula (III):

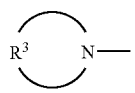

(III)

[wherein $R^3$ represents an alkylene group having 3-16 methylene groups, a substituted alkylene group (wherein the substituent is C1-C16 hydrocarbon group), an oxyalkylene group or an N-alkylamino-alkylene group, and there may or may not be a crosslinking between carbon atoms in the alkylene groups] as the lithium amide compound. In another example, the nitrogen-containing functional group can be introduced by using an urea compound such as DMI, NMP or the like; a ketone compound substituted with a dialkylamino group such as DEAB or the like; an aldehyde compound substituted with a dialkylamino group such as diethylaminobenzaldehyde or the like; a compound having a C=N double bond such as a Schiff base compound or the like; an isocyanate group-containing compound, a thioisocyanate group-containing compound or the like. It is more preferable to be a functional group obtained by reacting a modification terminator selected from a hydrocarbyloxy silane compound having a nitrogen-containing substituent with a polymer having a polymerization active terminal (living polymer). Moreover, it can be introduced by reacting with a polymerizable vinyl compound or conjugated diene compound having a nitrogen-containing functional group such as 2-vinylpyridine, 4-(N,N-dimethylamino)methylstyrene or the like.

In the formula (II), $R^2$ is an alkyl group having a carbon number of 1-12, a cycloalkyl group or an aralkyl group, and concretely and preferably includes methyl group, ethyl group, butyl group, octyl group, cyclohexyl group, 3-phenyl-1-propyl group, isobutyl group and so on. Moreover, $R^2$s may be same or different.

In the formula (III), $R^3$ is an alkylene group having 3-16 methylene groups, a substituted alkylene group, an oxyalkylene group or an N-alkylamino-alkylene group. There may or may not be a crosslinking between carbon atoms. At this moment, the substituted alkylene group includes monosubstituted to octasubstituted alkylene groups and as a substituent are mentioned a linear or branched alkyl group having a carbon number of 1-12, a cycloalkyl group, a bicycloalkyl group, an aryl group and an aralkyl group. As $R^3$ are concretely preferable trimethylene group, tetramethylene group, hexamethylene group, oxydiethylene group, N-alkylazadiethylene group such as N-methylazadiethylene group, N-butylazadiethylene group or the like, dodecamethylene group, hexadecamethylene group and so on.

The lithium amide compound may be previously prepared from a secondary amine and the lithium compound and applied to the polymerization reaction, or may be produced in the polymerization system. As the secondary amine are mentioned dimethyl amine, diethyl amine, dibutyl amine, dioctyl amine, dicyclohexyl amine, diisobutyl amine and the like, as well as cyclic amines such as pyrrolidine, piperidine, azacycloheptane (i.e., hexamethylene imine), N-methyl homopiperazine, N-butyl homopiperazine, morpholine, dodecamethylene imine, 2-(2-ethylhexyl)pyrrolidine, 3-(2-propyl)pyrrolidine, 3,5-bis(2-ethylhexyl)piperidine, 4-phenyl piperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4'-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, 1,5,5-trimethyl-3-azabicyclo[4.4.0]decane and the like. On the other hand, as the lithium compound may be used the aforementioned hydrocarbyl lithium.

The method for producing the low-molecular weight conjugated diene-based polymer (B) with the above polymerization initiator is not particularly limited. For example, the polymer (B) can be produced by polymerizing the monomer(s) in a hydrocarbon solvent inactive to the polymerization reaction. As the hydrocarbon solvent inactive to the polymerization reaction are mentioned propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a combination of two or more.

The anionic polymerization may be carried out in the presence of a randomizer. The randomizer can control the microstructure of the conjugated diene compound portion in the copolymer, and more concretely has an action of controlling the vinyl bond content of the conjugated diene compound portion in the copolymer, randomizing the conjugated diene compound unit and aromatic vinyl compound unit in the copolymer, or the like. As the randomizer are mentioned dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalent per 1 mol of the polymerization initiator.

The anionic polymerization is preferably carried out through a solution polymerization. The concentration of the monomer in the polymerization reaction solution is preferably within a range of 5 to 50% by mass, more preferably 10 to 30% by mass. Moreover, when the conjugated diene compound and the aromatic vinyl compound are used together, the content of the aromatic vinyl compound in the mixture of the monomers is preferably not more than 80% by mass, more preferably not more than 5% by mass, and can be properly selected depending on the aromatic vinyl compound content of the target copolymer. Also, the polymerization system is not particularly limited and may be a batch system or a continuous system.

The polymerization temperature in the anionic polymerization is preferably within a range of 0 to 150° C., more preferably 20 to 130° C. Also, the polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as the monomers, polymerization initiator, solvent and the like are preferable to be used after the reaction obstructing substances such as water, oxygen, carbon dioxide, protonic compound and the like are previously removed.

When the polymerization active site of the (co)polymer having the polymerization active site is modified with the modifying agent, a nitrogen-containing compound, a silicon-containing compound and a tin-containing compound are preferably used as the modifying agent. In this case, a nitrogen-containing functional group, a silicon-containing functional group or a tin-containing functional group can be introduced through the modification reaction.

The nitrogen-containing compound usable as the modifying agent is essentially the same as those described on the modification terminator usable in the rubber component (A), and is concretely preferable to have a substituted or unsubstituted amino group, amide group, imino group, imidazole group, nitrile group or pyridyl group. The nitrogen-containing compound suitable as the modifying agent includes isocyanate compounds such as diphenylmethane diisocyanate, crude MDI, trimethylhexamethylene diisocyanate, tolylene diisocyanate and so on, 4-(dimethylamino)benzophenone, 4-(diethylamino)benzophenone, 4-dimethylaminobenzylidene aniline, 4-dimethylaminobenzylidene butylamine, dimethylimidazolidinone, N-methylpyrrolidone and the like.

Also, the silicon-containing compound usable as the modifying agent is essentially the same as those described on the modification terminator usable in the rubber component (A). Moreover, a hydrocarbyloxy silane compound represented by the following formula (IV):

[wherein A is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid, carbonic acid dihydrocarbylester, cyclic tertiary amine, acyclic tertiary amine, nitrile, pyridine, sulfide and multi-sulfide; $R^4$ is a single bond or a bivalent inactive hydrocarbon group; $R^5$ and $R^6$ are independently a monovalent aliphatic hydrocarbon group having a carbon number of 1-20 or a monovalent aromatic hydrocarbon group having a carbon number of 6-18; n is an integer of 0-2; when plural $OR^6$s are existent, they may be same or different; and active proton and onium salt are not included in the molecule] and a partial condensate thereof, as well as a hydrocarbyloxy silane compound represented by the following formula (V):

[wherein $R^7$ and $R^8$ are independently a monovalent aliphatic hydrocarbon group having a carbon number of 1-20 or a monovalent aromatic hydrocarbon group having a carbon number of 6-18; p is an integer of 0-2; when plural $OR^8$s are existent, they may be same or different; and active proton and onium salt are not included in the molecule] and a partial condensate thereof are concretely preferable.

Among the functional groups in A of the formula (IV), imine includes ketimine, aldimine and amidine, and (thio) carboxylic acid ester includes an ester of an unsaturated carboxylic acid such as acrylate, methacrylate or the like, and acyclic tertiary amine includes N,N-disubstituted aromatic amine such as N,N-disubstituted aniline or the like, and cyclic tertiary amine can include (thio)ether as a part of a ring. As a metal in a metal salt of (thio)carboxylic acid may be mentioned an alkali metal, an alkaline earth metal, Al, Sn, Zn and the like.

As the bivalent inert hydrocarbon group in $R^4$ is preferable an alkylene group having a carbon number of 1-20. The alkylene group may be straight, branched or cyclic, but the straight chain is particularly preferable. As the straight alkylene group are mentioned methylene group, ethylene group, trimethylene group, tetramethylene group, pentamethylene group, hexamethylene group, octamethylene group, decamethylene group, dodecamethylene group and the like.

As $R^5$ and $R^6$ are mentioned an alkyl group having a carbon number of 1-20, an alkenyl group having a carbon number of 2-18, an aryl group having a carbon number of 6-18, an aralkyl group having a carbon number of 7-18 and the like. In this case, the alkyl group and alkenyl group may be straight, branched or cyclic, and include, for example, methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group) hexenyl group, octenyl group, cyclopentenyl group, cyclohexenyl group and the like. Also, the aryl group may have a substituent on the aromatic ring such as lower alkyl group or the like, and includes, for example, phenyl group, tolyl group, xylyl group, naphthyl group and the like. Further, the aralkyl group may have a substituent on the aromatic ring such as lower alkyl group or the like, and includes, for example, benzyl group, phenetyl group, naphthylmethyl group and the like.

In the formula (IV), n is an integer of 0-2 and preferably 0. Moreover, it is required that active proton and onium salt are not included in the molecule.

In the hydrocarbyloxy silane compound represented by the formula (IV), as the (thio)epoxy group-containing hydrocarbyloxy silane compound may be mentioned, for example, 2-glycidoxyethyl trimethoxysilane, 2-glycidoxyethyl triethoxysilane, (2-glycidoxyethyl)methyl dimethoxysilane, 3-glycidoxypropyl trimethoxysilane, 3-glycidoxypropyl triethoxysilane, (3-glycidoxypropyl)methyl dimethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl(methyl) dimethoxysilane and ones obtained by replacing the epoxy group in these compounds with a thioepoxy group. Among them, 3-glycidoxypropyl trimethoxysilane and 3-glycidoxypropyl triethoxysilane are particularly preferable.

As the imine group-containing hydrocarbyloxy silane compound may be mentioned N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine as well as trimethoxysilyl compounds, methyldiethoxysilyl compounds, ethyldiethoxysilyl compounds, methyldimethoxysilyl compounds, ethyldimethoxysilyl compounds and the like corresponding to these triethoxysilyl compounds. Among them, N-(1-methylpropylidene)-3-(triethoxysilyl)-1-propaneamine and N-(1,3-dimethylbutylidene)-3-(triethoxysilyl)-1-propaneamine are particularly preferable.

As the imine(amidine) group-containing compound are mentioned 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like. Among them, N-(3-triethoxysilylpropyl)-4,5-dihydroimidazole is preferable.

As the carboxylic acid ester group-containing compound are mentioned 3-methacryloyloxypropyl triethoxysilane, 3-methacryloyloxypropyl trimethoxysilane, 3-methacryloyl oxypropyl methyldiethoxysilane, 3-inethacryloyloxypropyl triisopropoxysilane and the like. Among them, 3-methacryloyloxypropyl trimethoxysilane is preferable.

As the isocyanate group-containing compound are mentioned 3-iso cyanatopropyl trimethoxy silane, 3-iso cyanatopropyl triethoxysilane, 3-isocyanatopropyl methyldiethoxysilane, 3-isocyanatopropyl triisopropoxysilane and the like. Among them, 3-isocyanatopropyl triethoxysilane is preferable.

As the carboxylic anhydride-containing compound are mentioned 3-triethoxysilylpropyl succinic anhydride, 3-trimethoxysilylpropyl succinic anhydride, 3-methyldiethoxysilylpropyl succinic anhydride and the like. Among them, 3-triethoxysilylpropyl succinic anhydride is preferable.

As the cyclic tertiary amine group-containing hydrocarbyloxy silane compound are mentioned 3-(1-hexamethyleneimino)propyl(triethoxy) silane, 3-(1-hexamethyleneimino)propyl(trimethoxy) silane, (1-hexamethyleneimino)methyl (trimethoxy) silane, (1-hexamethyleneimino)methyl (triethoxy) silane, 2-(1-hexamethyleneimino)ethyl (triethoxy) silane, 2-(1-hexamethyleneimino)ethyl (trimethoxy) silane, 3-(1-pyrrolidinyl)propyl(triethoxy) silane, 3-(1-pyrrolidinyl)propyl(trimethoxy) silane, 3-(1-heptamethyleneimino)propyl(triethoxy) silane, 3-(1-dodecamethyleneimino)propyl(triethoxy) silane, 3-(1-hexamethyleneimino)propyl(diethoxy)methylsilane, 3-(1-hexamethyleneimino)propyl(diethoxy)ethylsilane, 3-[10-(triethoxysilyl)decyl]-4-oxazoline and the like. Among them, 3-(1-hexamethyleneimino)propyl(triethoxy) silane and (1-hexamethyleneimino)methyl(trimethoxy) silane are preferable.

As the acyclic tertiary amine group-containing hydrocarbyloxy silane compound are mentioned 3-dimethylaminopropyl(triethoxy) silane, 3-dimethylaminopropyl(trimethoxy) silane, 3-diethylaminopropyl(triethoxy) silane, 3-diethylaminopropyl(trimethoxy) silane, 2-dimethylaminoethyl(triethoxy) silane, 2-dimethylaminoethyl(trimethoxy) silane, 3-dimethylaminopropyl(diethoxy)methylsilane, 3-dibutylaminopropyl(triethoxy) silane and the like. Among them, 3-diethylaminopropyl(triethoxy) silane and 3-dimethylaminopropyl(triethoxy) silane are preferable.

As the other hydrocarbyloxy silane compound are mentioned 2-(trimethoxysilylethyl) pyridine, 2-(triethoxysilylethyl)pyridine, 2-cyanoethyltriethoxy silane and the like.

The hydrocarbyloxy silane compounds of the formula (IV) may be used alone or in a combination of two or more. Also, a partial condensate of the hydrocarbyloxy silane compound may be used.

In the formula (V), $R^7$ and $R^8$ are the same as mentioned on $R^5$ and $R^6$ of the formula (IV), respectively.

As the hydrocarbyloxy silane compound represented by the formula (V) are mentioned, for example, tetramethoxy silane, tetraethoxy silane, tetra-n-propoxy silane, tetraisopropoxy silane, tetra-n-butoxy silane, tetraisobutoxy silane, tetra-sec-butoxy silane, tetra-tert-butoxy silane, methyltrimethoxy silane, methyltriethoxy silane, methyltripropoxy silane, methyltriisopropoxy silane, ethyltrimethoxy silane, ethyltriethoxy silane, propyltriethoxy silane, butyltrimethoxy silane, phenyltrimethoxy silane, phenyltriethoxy silane, dimethyldimethoxy silane, methylphenyldimethoxy silane, vinyltrimethoxy silane, vinyltriethoxy silane, divinyldimethoxy silane, divinyldiethoxy silane and the like. Among them, tetraethoxy silane is particularly preferable.

The hydrocarbyloxy silane compounds of the formula (V) may be used alone or in a combination of two or more. Also, a partial condensate of the hydrocarbyloxy silane compound may be used.

The tin-containing compound or silicon-containing compound usable as the modifying agent is preferable to be a coupling agent represented by the following formula (I).

$$R^1{}_a Z X_b \qquad\qquad (I)$$

[wherein $R^1$ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a+b=4]. The cold flow resistance of the polymer (B) can be improved by modifying with the coupling agent of the formula (I). Moreover, the polymer (B) obtained by modifying with the coupling agent of the formula (I) has at least one of tin-carbon bond and silicon-carbon bond.

As $R^1$ in the formula (I) are concretely mentioned methyl group, ethyl group, n-butyl group, neophyl group, cyclohexyl group, n-octyl group, 2-ethylhexyl group and the like. Also, as the coupling agent of the formula (I) are concretely preferable $SnCl_4$, $R^1SnCl_3$, $R^1_2SnCl_2$, $R^1_3SnCl$, $SiCl_4$, $R^1SiCl_3$, $R^1_2SiCl_2$, $R^1_3SiCl$ and the like, and $SnCl_4$ and $SiCl_4$ are particularly preferable.

The modification reaction of the polymerization active site with the above modifying agent is preferable to be carried out by a solution reaction. In such a solution may be included the monomer(s) used in the polymerization. Also, the reaction system of the modification reaction is not particularly limited and may be a batch system or a continuous system. Further, the reaction temperature of the modification reaction is not particularly limited as long as the reaction proceeds, and the reaction temperature in the polymerization reaction may be adopted as it is. The amount of the modifying agent used is preferably within a range of 0.25 to 3.0 mol, more preferably 0.5 to 1.5 mol per 1 mol of the polymerization initiator used for the production of the (co)polymer.

In the invention, the reaction solution containing the polymer (B) may be dried to separate the polymer (B) and then the resulting polymer (B) may be compounded into the rubber component (A), or the reaction solution containing the polymer (B) may be mixed with a rubber cement of the rubber component (A) at a solution state and then dried to obtain the mixture of the rubber component (A) and the polymer (B).

The first rubber composition according to the invention is required to contain a filler (C), while the second to fourth rubber compositions according to the invention are preferable to contain the filler (C). In the first to fourth rubber compositions according to the invention, it is also preferable that the filler (C) is included in an amount of 20 to 100 parts by mass based on 100 parts by mass of the rubber component (A). In the first to fourth rubber compositions according to the invention, when the amount of the filler (C) compounded is less than 20 parts by mass, the fracture characteristics and wear resistance of the vulcanized rubber are insufficient, while when it exceeds 100 parts by mass, the workability tends to be deteriorated. Also, in the rubber composition according to the invention, it is more preferable to contain 30 to 90 parts by mass of the filler (C) based on 100 parts by mass of the rubber composition (A). As the filler (C) are preferable carbon black and silica. Moreover, as the carbon black are preferable FEF, SRF, HAF, ISAF and SAP grade carbon blacks, and HAF, ISAF and SAF grade carbon blacks are more preferable. On the other hand, as the silica are preferable precipitated silica, fumed silica and the like, and the precipitated silica is more preferable. These reinforcing fillers may be used alone or in a combination of two or more. When the rubber composition according to the invention contains silica as the filler (C), it the amount of silica compounded is preferably not less than 10 parts by mass, more preferably 10 to 80 parts by mass based on 100 parts by mass of the rubber composition (A).

The rubber composition according to the invention may further contain a softening agent (F). As the softening agent (P) are mentioned process oils such as a paraffinic oil, a naphthenic oil, an aromatic oil and so on. The aromatic oil is preferable in view of the fracture characteristics and wear resistance, and the naphthenic oil and paraffinic oil are preferable in view of the low heat build-up and low-temperature characteristics. The amount of the softening agent compounded is not particularly limited, but a total amount of the low-molecular weight conjugated diene-based polymer (B) and the softening agent (F) compounded is preferable to be 5 to 80 parts by mass, more preferably 5 to 60 parts by mass based on 100 parts by mass of the rubber component (A). When the total amount of the polymer (B) and the softening agent (F) compounded is within the above range, the deterioration of the fracture characteristics of the vulcanized rubber can be suppressed. When the rubber composition according to the invention contains the softening agent (F), a proportion of the low-molecular weight conjugated diene-based polymer (B) in total of the low-molecular weight conjugated diene-based polymer (B) and the softening agent (F) is preferable to be not less than 20% by mass.

In the third rubber composition according to the invention, a chloroform extractability as extracted with chloroform for 48 hours after the vulcanization is preferable to be not less than 60% by mass based on a total mass of the low-molecular weight conjugated diene-based polymer (B) compounded. On the other hand, in the fourth rubber composition according to the invention, the chloroform extractability as extracted with chloroform for 48 hours after the vulcanization is preferable to be not more than 60% by mass, more preferably not more than 40% by mass based on a total mass of the low-molecular weight conjugated diene-based polymer (B) compounded. At this moment, the chloroform extractability (% by mass) is a ratio of the extracted polymer (B) to the total mass of the polymer (B) compounded as measured after the vulcanized rubber obtained by vulcanizing the rubber composition is extracted with chloroform for 48 hours.

The second to fourth rubber compositions according to the invention contain bubbles in a rubber matrix thereof. In the invention, the rubber composition containing bubbles in its rubber matrix is formed, for example, by adding and milling a usual rubber compound with a foaming agent (G) and vulcanizing the resulting rubber composition under usual conditions to expand the foaming agent (G) to thereby generate gas. A bubble fraction (Vs) in the rubber composition is preferable to be within a range of 5 to 35%. When the bubble fraction is less than 5%, the on-ice performance is deteriorated, while when it exceeds 35%, the fracture characteristics and wear resistance tend to be deteriorated. The bubbles contained in the second to fourth rubber compositions according to the invention are preferable to be expandable bubbles, but they may be ones formed by the destruction of hollow particles, ones formed by the elution of hydrophilic particles or ones formed by the dropping of deciduous foreign matters.

The bubble fraction (Vs) (%) can be calculated by the following equation (VI):

$$Vs = \{(\rho_0 - \rho_g)/(\rho_1 - \rho_g) - 1\} \times 100 \qquad (VI)$$

[wherein $\rho_1$ is a density of the rubber composition (g/cm³), $\rho_0$ is a density of a solid phase portion in the rubber composition (g/cm³) and $\rho_g$ is a density of a bubble portion in the rubber composition (g/cm³)]. Since the $\rho_g$ of the bubble portion is negligible small, the bubble fraction (Vs) (%) may be calculated by the following equation (VII):

$$Vs = (\rho_0/\rho_1 - 1) \times 100 \qquad (VII).$$

As the foaming agent (G) usable in the rubber composition according to the invention are mentioned azodicarbonamide (ADCA), dinitro sopentamethylenetetramine (DPT), dinitrosopentastyrenettramine, benzenesulfonyl hydrazide derivative, p,p'-oxybisbenzenesulfonyl hydrazide (OESH), ammonium bicarbonate producing carbon dioxide, sodium bicarbonate, ammonium carbonate, nitrososulfonyl azo compound producing nitrogen, N,N'-dimethyl-N,N'-dinitrosophthalamide, toluenesulfonyl hydrazide or a derivative thereof, p-toluenesulfonyl semicarbazide, p,p'-oxybisbenzenesulfonyl semicarbazide and so on. Among these foaming agents (G), azodicarbonamide (ADCA), dinitrosopentamethylenetetramine (DPT) and the like are preferable in view of manufacturing processability. These foaming agents (G) may be used alone or in a combination of two or more.

The form of the foaming agent (G) is not particularly limited, and can be properly selected from a particulate form, a liquid form and so on for any purpose. The form of the forming agent (G) can be observed by using, for example, a microscope. An average particle size of the particulate foaming agent (G) can be measured by using, for example, Coulter counter or the like.

In the rubber composition according to the invention, the foaming agent (G) is preferably compounded in an amount of 1 to 20 parts by mass, more preferably 2 to 10 parts by mass based on 100 parts by mass of the rubber component (A).

Also, the foaming agent (G) is preferable to be used together with urea, zinc stearate, zinc benzenesulphinate, zinc white or the like as a foaming aid. These foaming aids may be used alone or in a combination of two or more. The foaming reaction is promoted by co-using the foaming aid to increase the degree of the reaction completion, whereby the temporally unnecessary deterioration can be suppressed.

The rubber composition according to the invention can be properly compounded with additives usually used in the rubber industry such as an antioxidant, a silane coupling agent, a vulcanization accelerator, a vulcanization accelerating aid, a vulcanizing agent and the like within a scope of not damaging the object of the invention in addition to the above rubber component (A), the low-molecular weight conjugated diene-based polymer (B), the filler (C), the softening agent (F), the foaming agent (G) and the foaming aid. As these additives can be preferably used commercially available ones. The rubber composition can be produced by compounding the rubber component (A) with the low-molecular weight conjugated diene-based polymer (B), and, if necessary, the properly selected various additives and milling, warming, extruding and so on.

The rubber composition according to the invention is preferable as a rubber composition for a tire.

The pneumatic tire according to the invention is characterized by using the rubber composition in a tire member. As the tire member are mentioned a tread portion, a sidewall portion, a bead filler portion, a body ply skim portion, a reinforcing rubber portion for a run-flat tire and so on. Particularly, in the pneumatic tire according to the invention, the above rubber composition is preferably used in at least a ground contact region of the tread portion. The tire using the rubber composition in at least a ground contact region of the tread portion is excellent in the low fuel consumption, storage elastic modulus (G') at a high temperature, fracture strength, wet performance and on-ice performance. The pneumatic tire according to the invention is not particularly limited as long as the above rubber composition is used, and can be produced by the usual method. Moreover, as a gas filled into the tire can be used usual air or air having a regulated partial oxygen pressure but also inert gases such as nitrogen, argon, helium and so on.

EXAMPLES

The following examples are given in illustration of the invention and are not intended as limitations thereof.

Production Example 1 of Polymer (A)

Into a pressure glass vessel of 800 mL dried and purged with nitrogen are charged a solution of butadiene in cyclohexane (16%) and a solution of styrene in cyclohexane (21%) so as to be a butadiene monomer content of 40 g and a styrene monomer content of 10 g, and then 0.12 mmol of 2,2-ditetrahydrofurylpropane is charged and further 0-4 mmol of n-butyl lithium (n-BuLi) is added, and thereafter polymerization reaction is conducted in a warm water bath of 50° C. for 1.5 hours. In this case, the polymerization conversion is approximately 100%. Then, 0.5 mL of a solution of 2,6-di-t-butyl-p-cresol (BHT) in isopropanol (BHT concentration: 5% by mass) is added to the polymerization system to stop the polymerization reaction and thereafter dried according to a usual manner to obtain a polymer (A-1). The resulting high-molecular weight styrene-butadiene copolymer (polymer (A-1)) has a bound styrene content of 20% by mass, a vinyl bond content of 58% and a weight average molecular weight (Mw) without terminating by modification of 290,000. These measuring methods are described later.

Production Example 2 of Polymer (A)

Into a pressure glass vessel of 800 mL dried and purged with nitrogen are charged a solution of butadiene in cyclohexane (16%) and a solution of styrene in cyclohexane (21%) so as to be a butadiene monomer content of 40 g and a styrene monomer content of 10 g, and thereafter 0.12 mmol of 2,2-ditetrahydrofurylpropane is charged and further 0.4 mmol of n-butyl lithium (n-BuLi) is added, and then polymerization reaction is conducted in a warm water bath of 50° C. for 1.5 hours. In this case, the polymerization conversion is approximately 100%. Then, 0.1 mmol of tin tetrachloride as a modifying agent is added to the polymerization system to further conduct modification reaction at 50° C. for 30 minutes. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a polymer (A-2). The resulting high-molecular weight styrene-butadiene copolymer (polymer (A-2)) has a bound styrene content of 20% by mass, a vinyl bond content of 58% and a weight average molecular weight (Mw) without terminating by modification of 290,000. These measuring methods are described later.

Production Example 3 of Polymer (A)

A polymer (A-3) is obtained in the same manner as in Production Example 2 except that n-butyl lithium is changed to lithium hexamethylene imide. The resulting high-molecular weight styrene-butadiene copolymer (polymer (A-3)) has a bound styrene content of 20% by mass, a vinyl bond content of 58% and a weight average molecular weight (Mw) without terminating by modification of 290,000.

Production Example 4 of Polymer (A)

A polymer (A-4) is obtained in the same manner as in Production Example 2 except that 0.1 mmol of tin tetrachloride is changed to 0.4 mmol of dimethylimidazolidinone. The resulting high-molecular weight styrene-butadiene copolymer (polymer (A-4)) has a bound styrene content of 20% by mass, a vinyl bond content of 58% and a weight average molecular weight (Mw) without terminating by modification of 290,000.

Production Example 1 of Polymer (B)

The production of low-molecular weight polybutadienes (polymers (B)) having physical characteristics as shown in Tables 2-4 is conducted as follows (except for one obtained by using lithium haxamethylene imide (HMI-Li) as a polymerization initiator).

Into a pressure glass vessel of 800 mL dried and purged with nitrogen are charged 300 g of cyclohexane and 50 g of 1,3-butadiene and then ditetrahydrofurylpropane is charged so as to render a ratio of ditetrahydrofurylpropane/n-butyl lithium into 0.03. After 3.6 mmol of n-butyl lithium (n-BuLi) is further added, polymerization reaction is conducted at 50° C. for 5 hours. In this case, the polymerization conversion is approximately 100%. Then, various modifying agents are immediately added to the polymerization system to further conduct modification reaction at 50° C. for 30 minutes. In this case, a modifying agent/n-BuLi (molar ratio) is tin tetrachloride/n-BuLi=0.22 (molar ratio) in case of using tin tetrachloride, tetraethoxy silane/n-BuLi 0.9 (molar ratio) in case of using tetraethoxy silane, crude MDI/n-BuLi=0.9 (molar ratio) in case of using crude MDI, and S340/n-BuLi=0.9 (molar ratio). Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain each modified low-molecular weight polybutadiene. Moreover, when the modification reaction is not conducted, a low-molecular weight polybutadiene is similarly obtained except for the respective reaction.

Production Example 2 of Polymer (B)

Polymerization reaction is conducted in the same manner as in Production Example 1 of Polymer (B) except that a polymerization catalyst of Production Example 1 of Polymer (B) is changed from n-butyl lithium (n-BuLi) to 3.6 mmol of lithium hexamethylene imide (HMI-Li). After the completion of the polymerization reaction, 0.5 mL of a solution of 2,6-di-t-butyl-p-cresol (BHT) in isopropanol (BHT concentration: 5% by mass) is added to the polymerization system without conducting modification reaction to stop the polymerization reaction and further dried according to a usual manner to obtain a low-molecular weight polybutadiene.

The weight average molecular weight (Mw) and microstructure of the low-molecular weight polybutadienes obtained by Production Examples 1-2 of Polymer (B) are measured according to the following methods. Results are shown in Tables 2-4.

(1) Weight Average Molecular Weight (Mw)

The weight average molecular weight (Mw) of each polymer without terminating by modification as converted to polystyrene is measured through a gel permeation chromatography [GPC: HLC-8020 manufactured by TOSOH, column: GMH-XL (two series columns) manufactured by TOSOH, detector: differential refractometer (RI)] as a standard of monodisperse polystyrene.

(2) Microstructure and Bound Styrene Content

The microstructure of the polymer is determined by an infrared method (Morello method) and the bound styrene content of the polymer is determined from an integral ratio of $^1$H-NMR spectrum.

Then, a rubber composition having a compounding recipe as shown in Table 1 is prepared by using the polymers (A-1)-(A-4) and the polymers (B) obtained by Production Examples 1-2, and further vulcanized at 160° C. for 15 minutes to obtain a vulcanized rubber, and the storage elastic modulus (G'), loss tangent (tan δ) and chloroform extractability of the thus vulcanized rubber are measured according to the following methods. Results are shown in Tables 2-4.

(3) Storage Elastic Modulus (G')

The storage elastic modulus (G') is measured at temperatures of −20° C. and 50° C., a frequency of 15 Hz and a strain of 1% by using a viscoelasticity measuring device manufactured by RHEOMETRICS Corporation, and represented by an index on the basis that the storage elastic modulus (G') of the rubber composition of Comparative Example 1 is 100. As to the storage elastic modulus (G') at 50° C., the larger the index value, the higher the storage elastic modulus. On the other hand, as to the storage elastic modulus (G') at −20° C., the smaller the index value, the more excellent the flexibility at a low temperature.

(4) Loss Tangent (tan δ)

The loss tangent (tan δ) is measured at temperatures of 0° C. and 50° C., a frequency of 15 Hz and a strain of 1% by using a viscoelasticity measuring device manufactured by RHEOMETRICS Corporation, and represented by an index on the basis that the loss tangent (tan δ) of the rubber composition of Comparative Example 1 is 100. As to the loss tangent (tan δ) at 50° C., the smaller the index value, the more excellent the low heat build-up. On the other hand, as to the loss tangent (tan δ) at 0° C., the larger the index value, the more excellent the wet performance.

(5) Chloroform Extractability

A sample of the vulcanized rubber is extracted with chloroform as a solvent through a Soxhlet extractor for 48 hours, and a proportion of the extracted polymer (B) based on a total mass of the polymer (B) compounded (% by mass) is calculated by the residue of the sample of the vulcanized rubber.

TABLE 1

|   |   | Amount compounded (parts by mass) |
|---|---|---|
| Rubber component (A) | BR *1 | 50 |
|  | SBR *2 | 50 |
| Polymer (B) *3 |  | 15 |
| Carbon black *4 |  | 27 |
| Silica *5 |  | 27 |
| Silane coupling agent *6 |  | 2.5 |
| Aromatic oil |  | 5 |
| Stearic acid |  | 2 |
| Antioxidant 6C *7 |  | 1 |
| Zinc white |  | 3 |
| Vulcanization accelerator DPG *8 |  | 0.8 |
| Vulcanization accelerator DM *9 |  | 1 |
| Vulcanization accelerator NS *10 |  | 1 |
| Sulfur |  | 1.5 |

*1 "BR01" manufactured by JSR Corporation, high-cis 1,4-polybutadiene, weight average molecular weight = 600,000
*2 The kind of polymers (A-1)-(A-4) is shown in Tables 2-3.
*3 Polymer (B) obtained by Production Example 1 or 2
*4 Seast KH (trade mark, N339) manufactured by Tokai Carbon Co., Ltd.
*5 Nipsil AQ (trade mark) manufactured by TOSOH Silica Co., Ltd.
*6 Si 69 (trade mark) manufactured by Degussa Corporation, bis(3-triethoxysilylpropyl) tetrasulfide.
*7 N-(1,3-dimethylbutyl)-N'-phenyl-p-phenylenediamine
*8 Diphenyl guanidine
*9 Dibenzothiazyl disulfide
*10 N-t-butyl-2-benzothiazyl sulfenamide

TABLE 2

|  |  | Comparative Example 1 | Comparative Example 2 | Comparative Example 3 | Comparative Example 4 | Example 1 | Example 2 | Example 3 | Example 4 | Example 5 | Example 6 | Example 7 |
| --- | --- | --- | --- | --- | --- | --- | --- | --- | --- | --- | --- | --- |
| Kind of polymer (A) | Matrix | A-1 (Unmodified) | A-1 (Unmodified) | A-1 (Unmodified) | A-1 (Unmodified) | A-1 (Unmodified) | A-1 (Unmodified) | A-1 (Unmodified) | A-1 (Unmodified) | A-1 (Unmodified) | A-1 (Unmodified) | A-1 (Unmodified) |
| Polymer (B) Modification condition | Initiator | n-BuLi | n-BuLi | n-BuLi | n-BuLi | n-BuLi | n-BuLi | n-BuLi | n-BuLi | n-BuLi | n-BuLi | n-BuLi |
|  | Modifying agent | — | — | TTC*11 | TTC*11 | TTC*11 | TTC*11 | TTC*11 | TTC*11 | TTC*11 | TTC*11 | TTC*11 |
| Polymer (B) Weight average molecular weight (Mw) (×10³) |  | 25 | 80 | 1 | 220 | 3 | 15 | 25 | 40 | 80 | 120 | 180 |
| Polymer (B) Microstructure | Bound styrene content (% by mass) | 0 | 0 | 0 | 0 | 0 | 0 | 0 | 0 | 0 | 0 | 0 |
|  | Vinyl bond content (%) | 20 | 20 | 20 | 20 | 20 | 20 | 20 | 20 | 20 | 20 | 20 |
| Storage elastic modulus at −20° C. (index) | Good at lower value | 100 | 143 | 76 | 115 | 77 | 79 | 80 | 89 | 98 | 105 | 109 |
| Loss tangent at 50° C. (index) | Good at lower value | 100 | 85 | 102 | 72 | 99 | 96 | 94 | 91 | 80 | 77 | 75 |
| Loss tangent at 0° C. (index) | Good at higher value | 100 | 95 | 109 | 89 | 107 | 105 | 102 | 100 | 98 | 95 | 93 |
| Storage elastic modulus at 50° C. (index) | Good at higher value | 100 | 120 | 86 | 131 | 92 | 96 | 98 | 105 | 119 | 125 | 130 |
| Chloroform extractability (% by mass) |  | 67 | 32 | 85 | 9 | 80 | 71 | 64 | 45 | 30 | 17 | 12 |

TABLE 3

|  |  | Example 8 | Example 9 | Example 10 | Example 11 | Example 12 | Example 13 |
| --- | --- | --- | --- | --- | --- | --- | --- |
| Kind of polymer (A) | Matrix | A-1 (Unmodified) | A-1 (Unmodified) | A-1 (Unmodified) | A-1 (Unmodified) | A-1 (Unmodified) | A-1 (Unmodified) |
| Polymer (B) Modification condition | Initiator | HMI-Li*12 | n-BuLi | n-BuLi | n-BuLi* | HMI-Li*12 | n-BuLi |
|  | Modifying agent | — | MDI*13 | TEOS*14 | S340*15 | MDI*13 | TEOS*14 |
| Polymer (B) Weight average molecular weight (Mw) (×10³) |  | 27 | 25 | 25 | 25 | 84 | 80 |
| Polymer (B) Microstructure | Bound styrene content (% by mass) | 0 | 0 | 0 | 0 | 0 | 0 |
|  | Vinyl bond content (%) | 20 | 20 | 20 | 20 | 20 | 20 |
| Storage elastic modulus at −20° C. (index) | Good at lower value | 82 | 81 | 79 | 73 | 98 | 99 |
| Loss tangent at 50° C. (index) | Good at lower value | 95 | 94 | 94 | 92 | 80 | 81 |
| Loss tangent at 0° C. (index) | Good at higher value | 103 | 101 | 103 | 101 | 100 | 99 |
| Storage elastic modulus at 50° C. (index) | Good at higher value | 99 | 99 | 98 | 96 | 121 | 119 |
| Chloroform extractability (% by mass) |  | 63 | 63 | 62 | 61 | 29 | 27 |

TABLE 4

|  |  | Example 14 | Example 15 | Example 16 | Example 17 | Example 18 | Example 19 |
| --- | --- | --- | --- | --- | --- | --- | --- |
| Kind of polymer (A) | Matrix | A-2 (TTC*11) | A-2 (TTC*11) | A-1 (Unmodified) | A-2 (TTC*11) | A-3 (HMI-Li*12) (TTC*11) | A-4 (DMI*16) |
| Polymer (B) Modification condition | Initiator | n-BuLi | n-BuLi | n-BuLi | n-BuLi | n-BuLi | n-BuLi |
|  | Modifying agent | TTC*11 | TTC*11 | S340*15 | TTC*11 | TTC*11 | TTC*11 |
| Polymer (B) Weight average molecular weight (Mw) (×10³) |  | 80 | 25 | 80 | 80 | 80 | 80 |

TABLE 4-continued

|  |  | Example 14 | Example 15 | Example 16 | Example 17 | Example 18 | Example 19 |
|---|---|---|---|---|---|---|---|
| Polymer (B) Microstructure | Bound styrene content (% by mass) | 0 | 0 | 0 | 0 | 0 | 0 |
|  | Vinyl bond content (%) | 20 | 20 | 20 | 20 | 20 | 20 |
| Storage elastic modulus at −20° C. (index) | Good at lower value | 87 | 87 | 96 | 87 | 82 | 78 |
| Loss tangent at 50° C. (index) | Good at lower value | 74 | 74 | 78 | 74 | 71 | 69 |
| Loss tangent at 0° C. (index) | Good at higher value | 96 | 96 | 98 | 96 | 94 | 93 |
| Storage elastic modulus at 50° C. (index) | Good at higher value | 115 | 115 | 118 | 115 | 114 | 112 |
| Chloroform extractability (% by mass) |  | 28 | 65 | 26 | 30 | 31 | 30 |

*11 Tin tetrachloride.
*12 Lithium hexamethylene imide.
*13 Crude MDI, "MR400" manufactured by Nippon Urethane Corporation.
*14 Tetraethoxy silane.
*15 N-(1,3-dimethylbutylidene)-3-(triethoxysilyl)-1-propanediamine.
*16 Dimethylimidazolidinone.

As seen from Table 2, when the weight average molecular weight without terminating by modification is not less than 2,000 but less than 150,000 (Examples 1-15), the storage elastic modulus at −20° C. can be lowered without lowering the loss tangent at 0° C., and further the loss tangent at 50° C. can be also lowered.

As seen from Tables 3 and 4, even if the kind of modifying agent is changed to a nitrogen-containing compound or silicon-containing compound, the effect of the invention is obtained. When the rubber component (A) is modified, the storage elastic modulus at −20° C. can be further lowered and also the loss tangent at 50° C. can be lowered.

Production Example of Polymer (B-1)

Into a pressure glass vessel of 800 mL dried and purged with nitrogen are charged 300 g of cyclohexane and 50 g of 1,3-butadiene, and further 5.28 mmol of n-butyl lithium (n-BuLi) is added, and then polymerization reaction is conducted at 50° C. for 2 hours. In this case, the polymerization conversion is approximately 100%. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a polymer (B-1).

Production Example of Polymers (B-2)-(B-4)

Into a pressure glass vessel of 800 mL dried and purged with nitrogen are charged 300 g of cyclohexane and 50 g of 1,3-butadiene, and further 5.28 mmol of n-butyl lithium (n-BuLi) is added, and then polymerization reaction is conducted at 50° C. for 2 hours. In this case, the polymerization conversion is approximately 100%. Then, a modifying agent shown in Table 4 as a modifying agent is immediately added in an amount shown in Table 4 to the polymerization system to further conduct modification reaction at 50° C. for 30 minutes. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain polymers (B-2)-(B-4).

Production Example of Polymer (B-5)

A polymer (B-5) is obtained in the same manner as in the polymer (B-1) except that 5.28 mmol of lithium hexamethylene imide prepared in situ [HMI-Li; a molar ratio of hexamethylene imine (HMI)/lithium (Li)=0.9] in terms of a lithium equivalent is used as the polymerization initiator instead of n-butyl lithium (n-BuLi).

Production Example of Polymer (B-6)

A polymer (B-4) is obtained in the same manner as in the polymer (B-2) except that 5.28 mmol of lithium hexamethylene imide prepared in situ [HMI-Li; a molar ratio of hexamethylene imine (HMI)/lithium (Li) =0.9] in terms of a lithium equivalent is used as the polymerization initiator instead of n-butyl lithium (n-BuLi).

The weight average molecular weight (Mw), microstructure and bound styrene content of the polymers (B-1)-(B-6) produced as described above are measured according to the aforementioned methods. Results are shown in Table 5.

TABLE 5

|  |  | Polymer (B-1) | Polymer (B-2) | Polymer (B-3) | Polymer (B-4) | Polymer (B-5) | Polymer (B-6) |
|---|---|---|---|---|---|---|---|
| Polymerization initiator | Kind | n-BuLi | n-BuLi | n-BuLi | n-BuLi | HMI-Li *12 | HMI-Li *12 |
| Modification agent | Kind | — | MDI *13 | TTC *11 | S340 *15 | — | TTC *11 |
|  | Using amount (mmol) | — | 0.22 | 0.9 | 0.9 | — | 0.22 |

TABLE 5-continued

|  | Polymer (B-1) | Polymer (B-2) | Polymer (B-3) | Polymer (B-4) | Polymer (B-5) | Polymer (B-6) |
|---|---|---|---|---|---|---|
| Bound styrene content (% by mass) | 0 | 0 | 0 | 0 | 0 | 0 |
| Vinyl bond content (%) | 20 | 20 | 20 | 20 | 20 | 20 |
| Weight average molecular weight (Mw) | $20 \times 10^3$ | $20 \times 10^3$ | $20 \times 10^3$ | $20 \times 10^3$ | $20 \times 10^3$ | $20 \times 10^3$ |

*11 Tin tetrachloride.
*12 Lithium hexamethylene imide.
*13 Crude MDI, MR400 manufactured by Nippon Urethane Corporation.
*15 N-(1,3-dimethylbutylidene)-3-(triethoxysilyl)-1-propanediamine.

Production Example of Polymer (B-7)

Into a pressure glass vessel of 800 mL dried and purged with nitrogen are charged 300 g of cyclohexane and 50 g of 1,3-butadiene, and further 1.06 mmol of n-butyl lithium (n-BuLi) is added, and then polymerization reaction is conducted at 50° C. for 2 hours. In this case, the polymerization conversion is approximately 100%. Thereafter, 0.5 mL of a solution of 2,6-di-t-butyl-p-cresol (BUT) in isopropanol (BHT concentration: 5% by mass) is added to the polymerization system to stop the polymerization reaction and then dried according to a usual manner to obtain a polymer (B-7).

Production Example of Polymer (B-8)

Into a pressure glass vessel of 800 mL dried and purged with nitrogen are charged 300 g of cyclohexane and 50 g of 1,3-butadiene, and further 1.06 mmol of n-butyl lithium (n-BuLi) is added, and then polymerization reaction is conducted at 50° C. for 2 hours. In this case, the polymerization conversion is approximately 100%. Then, 0.22 mmol of tin tetrachloride ($SnCl_4$) as a modifying agent is immediately added to the polymerization system to further conduct modification reaction at 50° C. for 30 minutes. In this case, the polymerization conversion is approximately 100%. Thereafter, 0.5 mL of a solution of 2,6-di-t-butyl-p-cresol (BET) in isopropanol (BHT concentration: 5% by mass) is added to the polymerization system to stop the polymerization reaction and then dried according to a usual manner to obtain a polymer (B-8).

Production Example of Polymer (B-9)

A polymer (B-9) is obtained in the same manner as in the polymer (B-8) except that 1.06 mmol of lithium hexamethylene imide prepared in situ [HMI-Li; a molar ratio of hexamethylene imine (HMI)/lithium (Li)=0.9] in terms of a lithium equivalent is used as the polymerization initiator instead of n-butyl lithium (n-BuLi).

Production Example of Polymer (B-10)

A polymer (B-10) is obtained in the same manner as in the polymer (B-8) except that 45 g of 1,3-butadiene and 5 g of styrene are used instead of 50 g of 1,3-butadiene and further 0.53 mmol of ditetrahydrofurylpropane is added.

Production Example of Polymers (B-11)-(B-12)

Polymers (B-11)-(B-12) are obtained in the same manner as in the polymers (B-8)-(B-9) except that 0.9 mmol of tetraethoxy silane is used instead of tin tetrachloride.

Production Example of Polymer (B-13)

A polymer (B-13) is obtained in the same manner as in the polymer (B-8) except that 0.9 mmol of N-(1,3-dimethylbutylidene)-3-(triethoxysilyl)-1-propanediamine (S340) is used instead of tin tetrachloride.

The weight average molecular weight (Mw), microstructure and bound styrene content of the polymers (B-7)-(B-13) produced as described above are measured according to the aforementioned methods. Results are shown in Table 6.

TABLE 6

|  | Polymer (B-7) | Polymer (B-8) | Polymer (B-9) | Polymer (B-10) | Polymer (B-11) | Polymer (B-12) | Polymer (B-13) |
|---|---|---|---|---|---|---|---|
| Polymerization initiator | n-BuLi | n-BuLi | HMI-Li | n-BuLi | n-BuLi | n-BuLi | n-BuLi |
| Modifying agent | — | $SnCl_4$ | $SnCl_4$ | — | Tetraethoxy silane | Tetraethoxy silane | S340 |
| Bound styrene content (% by mass) | 0 | 0 | 0 | 10 | 0 | 10 | 0 |
| Vinyl bond content (%) | 20 | 20 | 20 | 60 | 20 | 60 | 20 |

TABLE 6-continued

|  | Polymer (B-7) | Polymer (B-8) | Polymer (B-9) | Polymer (B-10) | Polymer (B-11) | Polymer (B-12) | Polymer (B-13) |
|---|---|---|---|---|---|---|---|
| Weight average molecular weight (Mw) | $10 \times 10^4$ | $10 \times 10^4$ | $10 \times 10^4$ | $10 \times 10^4$ | $10 \times 10^4$ | $10 \times 10^4$ | $10 \times 10^4$ |

Then, a rubber composition having a compounding recipe as shown in Table 7 is prepared by using the polymers (B-1)-(B-6), and further vulcanized under usual conditions to obtain a vulcanized rubber. As to the resulting vulcanized rubber, the bubble fraction is calculated according to the above-mentioned equation (VII), and the chloroform extractability is measured according to the above-mentioned method, and the storage elastic modulus (G'), tan δ and tensile strength are measured according to the following methods. Results are shown in Table 8.

(6) Tensile Strength

A tensile test is conducted at room temperature according to JIS K6301-1995 to measure the tensile strength, which is represented by an index on basis that the tensile strength of the rubber composition of Comparative Example 5 is 100. The larger the index value, the better the fracture strength.

(7) Storage Elastic Modulus (G')

The storage elastic modulus (G') is measured at a temperature of −20° C., a frequency of 10 Hz and a strain of 0.1% by using a viscoelasticity measuring device manufactured by RHEOMETRICS Corporation, and represented by an index on the basis that an inverse number of the storage elastic modulus (G') of the rubber composition of Comparative Example 5 is 100. The larger the index value, the lower the storage elastic modulus and the more excellent the on-ice performance.

(8) Tan δ

Tan δ is measured under a condition that a frequency is 10 Hz, a strain is 0.1% and a temperature is 0° C. by using a viscoelasticity measuring device manufactured by RHEO-METRICS Corporation, and represented by an index on the basis that tan δ of the rubber composition of Comparative Example 5 is 100. The larger the index value, the more excellent the wet performance.

TABLE 7

|  |  | Amount compounded (parts by mass) |
|---|---|---|
| Rubber component (A) | Natural rubber *17 | 60 |
|  | Polybutadiene rubber *18 | 40 |
| Polymer (B) *19 |  | 20 |
| DPT/urea *20 |  | 5.7 |
| Carbon black N220 |  | 60 |
| Stearic acid |  | 1.5 |
| Zinc white |  | 1.5 |
| Antioxidant 6C *21 |  | 1 |
| Vulcanization accelerator DM *22 |  | 0.2 |
| Vulcanization accelerator CZ *23 |  | 0.5 |
| Sulfur |  | 1 |

*17 Molecular weight of 2,000,000.
*18 "BR01" manufactured by JSR Corporation, high-cis 1,4-polybutadiene, molecular weight of 600,000.
*19 Polymers (B-1)-(B-6) produced according to the above-mentioned methods. The kind of polymer used is shown in Table 8.
*20 Dinitrosopentamethylenetetramine (DPT):urea = 1:1 (mass ratio).
*21 N-(1,3-dimethylbutyl)-N'-phenyl-p-phenylenediamine.
*22 Di-2-benzothiazolyl disulfide.
*23 N-cyclohexyl-2-benzothiazolyl sulfenamide.

TABLE 8

|  |  |  | Comparative Example 5 | Example 20 | Example 21 | Example 22 | Example 23 | Example 24 |
|---|---|---|---|---|---|---|---|---|
| Kind of polymer (B) used |  |  | B-1 | B-2 | B-3 | B-4 | B-5 | B-6 |
| Bubble fraction |  | % | 20 | 20 | 20 | 20 | 20 | 20 |
| Fracture strength | Tensile strength | index | 100 | 103 | 103 | 103 | 102 | 104 |
| On-ice performance | Storage elastic modulus (G') (−20° C.) | index | 100 | 115 | 117 | 118 | 113 | 122 |
| Wet performance | Tan δ (0° C.) | index | 100 | 98 | 98 | 97 | 99 | 97 |
| Chloroform extractability |  | % by mass | 81 | 78 | 79 | 78 | 74 | 70 |

As seen from Table 8, the rubber compositions of Examples 20-24 using the polymers (B-2)-(B-6) with at least one functional group in their molecules are excellent in the on-ice performance as compared with the rubber composition in Comparative Example 5 using the polymer (B-1) because the storage elastic modulus (G') at −20° C. is largely lowered. Also, it is understood in the rubber compositions in Examples that the tensile strength is improved from the effect of improving the dispersibility of the filler by using the polymers (B-2)-(B-6).

Then, a rubber composition having a compounding recipe as shown in Table 9 is prepared by using the polymers (B-7)-(B-10) or aromatic oil, and further vulcanized at 160° C. for 15 minutes to obtain a vulcanized rubber. As to the resulting vulcanized rubber, the bubble fraction is calculated according to the above-mentioned equation (VII), and the chloroform extractability is measured according to the above-mentioned method, and the tensile strength, storage elastic modulus (G') and tan δ are measured according to the following methods. Results are shown in Table 10.

(9) Tensile Strength

A tensile test is conducted at room temperature according to JIS K6301-1995 to measure a tensile strength, which is represented by an index on basis that the tensile strength of the rubber composition of Comparative Example 6 is 100. The larger the index value, the better the fracture strength.

TABLE 9

|  |  | Amount compounded (parts by mass) |
|---|---|---|
| Rubber component (A) | Natural rubber *17 | 60 |
|  | Polybutadiene rubber *18 | 40 |
| Aromatic oil or polymer (B) *24 |  | 20 |
| DPT/urea *20 |  | 5.7 |
| Carbon black (N220) |  | 60 |
| Stearic acid |  | 1.5 |
| Zinc white |  | 1.5 |
| Antioxidant 6C *21 |  | 1 |
| Vulcanization accelerator DM *22 |  | 0.2 |
| Vulcanization accelerator CZ *23 |  | 0.5 |
| Sulfur |  | 1 |

*17 Molecular weight of 2,000,000.
*18 "BR01" manufactured by JSR Corporation, high-cis 1,4-polybutadiene, molecular weight of 600,000.
*20 Dinitrosopentamethylenetetramine (DPT):urea = 1:1 (mass ratio).
*21 N-(1,3-dimethylbutyl)-N'-phenyl-p-phenylenediamine.
*22 Di-2-benzothiazolyl disulfide.
*23 N-cyclohexyl-2-benzothiazolyl sulfenamide.
*24 Aromatic oil or the kind of the polymer [polymers (B-7)-(B-10)] is shown in Table 10.

TABLE 10

|  |  |  | Comparative Example 6 | Comparative Example 7 | Example 25 | Example 26 | Example 27 |
|---|---|---|---|---|---|---|---|
| Aromatic oil or the kind of the polymer (B) |  |  | Aromatic oil | B-7 | B-8 | B-9 | B-10 |
| Bubble fraction |  | % | 20 | 20 | 20 | 20 | 20 |
| Fracture strength | Tensile strength | index | 100 | 108 | 112 | 111 | 110 |
| On-ice performance | G' (−20° C.) | index | 100 | 103 | 114 | 119 | 101 |
| Storage elastic modulus at a high temperature G' (50° C.). |  | index | 100 | 123 | 120 | 118 | 128 |
| Chloroform extractability |  | % by mass | 85 | 38 | 32 | 30 | 35 |

(10) Storage Elastic Modulus (G')

The storage elastic modulus (G') at a temperature of −20° C. or 50° C. is measured under a condition that a frequency is 15 Hz and a strain is 1.0% by using a viscoelasticity measuring device manufactured by RHEOMETRICS Corporation. The storage elastic modulus (G') at −20° C. is represented by an index on basis that an inverse number of the storage elastic modulus (G') of the rubber composition of Comparative Example 6 is 100. The larger the index value, the more excellent the on-ice performance. On the other hand, the storage elastic modulus (G') at 50° C. is represented by an index on basis that the storage elastic modulus (G') of the rubber composition of Comparative Example 6 is 100. The larger the index value, the more excellent the storage elastic modulus (G') at a high temperature.

As seen from Table 10, the rubber compositions of Examples 25-26 and Comparative Examples 7-8 using the polymers (B-7)-(B-10) with the specified weight average molecular weight are good in the tensile strength and storage elastic moduli (G') at −20° C. and 50° C. as compared with the rubber composition of Comparative Example 6 using the aromatic oil, and impart the excellent fracture strength and on-ice performance to a tire while maintaining the storage elastic modulus (G') at a high temperature. Also, in the rubber compositions of Examples 25-26, the storage elastic modulus (G') at −20° C. is largely lowered by using the polymers (B-8)-(B-9) having at least one functional group in their molecules, and the on-ice performance is excellent as compared with the rubber compositions of Comparative Examples 7-8.

Then, a rubber composition having a compounding recipe as shown in Table 11 is prepared by using the polymers (B-7), (B-11), (B-10) and (B-13), and further vulcanized at 160° C. for 15 minutes to obtain a vulcanized rubber. As to the resulting vulcanized rubber, the bubble fraction is calculated according to the above-mentioned equation (VII), the chloroform extractability is measured according to the above-mentioned method, and the tensile strength, storage elastic modulus (G') and tan δ are measured according to the following methods. Results are shown in Table 11.

(11) Tensile Strength

A tensile test is conducted at room temperature according to JIS K6301-1995 to measure a tensile strength, which is represented by an index on basis that the tensile strength of the rubber composition of Comparative Example 9 is 100. The larger the index value, the better the fracture strength.

(12) Storage Elastic Modulus (G')

The storage elastic modulus (G') is measured at a temperature of −20° C., a frequency of 10 Hz and a strain of 0.1% by using a viscoelasticity measuring device manufactured by RHEOMETRICS Corporation, and represented by an index on basis that the storage elastic modulus (G') of the rubber composition of Comparative Example 9 is 100. The smaller the index value, the more excellent the on-ice performance.

(13) Tan δ

Tan δ is measured under a condition that a frequency is 10 Hz, a strain is 0.1% and a temperature is 0° C. by using a viscoelasticity measuring device manufactured by RHEOMETRICS Corporation, and represented by an index on the basis that tan δ of the rubber composition of Comparative Example 9 is 100. The larger the index value, the more excellent the wet performance.

TABLE 11

|  |  |  |  | Comparative Example 9 | Example 27 | Example 28 | Comparative Example 10 |
|---|---|---|---|---|---|---|---|
| Compounding recipe | Rubber component (A) | Natural rubber *25 | part by mass | 40 | 40 | 40 | 40 |
|  |  | Polybutadiene *26 |  | 60 | 60 | 60 | 60 |
|  | Carbon black SAF |  |  | 25 | 25 | 25 | 25 |
|  | Silica *27 |  |  | 40 | 40 | 40 | 40 |
|  | Silane coupling agent *28 |  |  | 4.0 | 4.0 | 4.0 | 4.0 |
|  | Stearic acid |  |  | 2.0 | 2.0 | 2.0 | 2.0 |
|  | Low-molecular weight conjugated diene-based polymer (B) | B-7 |  | 15 | — | — | — |
|  |  | B-11 |  | — | 15 | — | — |
|  |  | B-10 |  | — | — | — | 15 |
|  |  | B-13 |  | — | — | 15 | — |
|  | ZnO |  |  | 2.0 | 2.0 | 2.0 | 2.0 |
|  | Antioxidant IPPD *29 |  |  | 2.5 | 2.5 | 2.5 | 2.5 |
|  | Vulcanization accelerator MBTS *30 |  |  | 0.6 | 0.6 | 0.6 | 0.6 |
|  | Vulcanization accelerator CBS *31 |  |  | 1.5 | 1.5 | 1.5 | 1.5 |
|  | Sulfur |  |  | 1.5 | 1.5 | 1.5 | 1.5 |
|  | DPT/urea *32 |  |  | 5.7 | 5.7 | 5.7 | 5.7 |
| Bubble fraction (%) |  |  |  | 20 | 20 | 20 | 20 |
| Fracture strength, tensile strength (index) |  |  |  | 100 | 105 | 104 | 110 |
| On-ice performance, G' (−20° C.) (index) |  |  |  | 100 | 121 | 119 | 88 |
| Wet performance, tanδ (0° C.) (index) |  |  |  | 100 | 99 | 98 | 120 |
| Chloroform extractability |  |  |  | 69 | 67 | 65 | 67 |

*25 RSS #1, molecular weight of 2,000,000.
*26 Cis-1,4-polybutadiene, UBEPOL BR150L (trade name) manufactured by UBE Industries, Ltd., molecular weight of 500,000.
*27 Nipsil AQ (trade name) manufactured by Nippon Silica Industrial Co., Ltd.
*28 Si 69 (trade name) manufactured by Degussa Corporation.
*29 N-isopropyl-N'-phenyl-p-phenylenediamine.
*30 Dibenzothiazyl disulfide.
*31 N-cyclohexyl-2-benzothiazole sulfenamide.
*32 Dinitrosopentamethylenetetramine (DPT):urea = 1:1 (mass ratio).

As seen from Table 11, the pneumatic tires using the rubber compositions of Examples 27-28 are excellent in the wet performance and on-ice performance, and further the durability.

The invention claimed is:

1. A rubber composition characterized by compounding a polymer (B) comprising conjugated diene and having at least one functional group, an aromatic vinyl compound content of less than 5% by mass and a weight average molecular weight as measured without terminating by modification through a gel permeation chromatography and converted to polystyrene of not less than 2,000 but less than 150,000 and a filler (C) into a rubber component (A) having a weight average molecular weight as measured without terminating by modification through a gel permeation chromatography and converted to polystyrene of not less than 150,000,
    wherein the polymer (B) is produced by (1) (co)polymerizing monomers with a polymerization initiator to produce a (co)polymer having a polymerization active site and then modifying the polymerization active site with a modifying agent, or (2) (co)polymerizing monomers with a polymerization initiator having a functional group.

2. A rubber composition formed by compounding a polymer (B) comprising conjugated diene and having at least one functional group, an aromatic vinyl compound content of less than 5% by mass and a weight average molecular weight as measured without terminating by modification through a gel permeation chromatography and converted to polystyrene of not less than 2,000 but less than 150,000 into a rubber component (A) composed of at least one of natural rubber and synthetic diene-based rubbers having a weight average molecular weight as measured without terminating by modification through a gel permeation chromatography and converted to polystyrene of not less than 150,000, characterized in that bubbles are contained in a rubber matrix of the rubber composition,
    wherein the polymer (B) is produced by (1) (co)polymerizing monomers with a polymerization initiator to produce a (co)polymer having a polymerization active site and then modifying the polymerization active site with a modifying agent, or (2) (co)polymerizing monomers with a polymerization initiator having a functional group.

3. A rubber composition according to claim 2, wherein the polymer (B) has a weight average molecular weight as measured without terminating by modification through a gel permeation chromatography and converted to polystyrene of 2,000 to 50,000.

4. A rubber composition according to claim 2, wherein the polymer (B) has a weight-average molecular weight as measured without terminating by modification through a gel permeation chromatography and converted to polystyrene of not less than 50,000 but less than 150,000.

5. A rubber composition according to claim 3, wherein a chloroform extractability as extracted with chloroform for 48 hours after vulcanization is not less than 60% by mass based on a total mass of the polymer (B) compounded.

6. A rubber composition according to claim 4, wherein a chloroform extractability as extracted with chloroform for 48 hours after vulcanization is not more than 60% by mass based on a total mass of the polymer (B) compounded.

7. A rubber composition according to claim 1, wherein the polymer (B) is included in an amount of 1 to 60 parts by mass based on 100 parts by mass of the rubber component (A).

8. A rubber composition according to claim 1, wherein the polymer (B) has a vinyl bond content in a conjugated diene compound portion of 5 to 80% by mass.

9. A rubber composition according to claim 1, wherein the polymer (B) is a butadiene homopolymer or a styrene-butadiene copolymer.

10. A rubber composition according to claim 1, wherein the functional group of the polymer (B) is at least one selected from the group consisting of a tin-containing functional group, a silicon-containing functional group and a nitrogen-containing functional group.

11. A rubber composition according to claim 10, wherein the polymer (B) is one formed by modifying a polymerization active site thereof with a tin-containing compound, a silicon-containing compound or a nitrogen-containing compound.

12. A rubber composition according to claim 11, wherein the tin-containing compound or the silicon-containing compound is a modification terminator represented by the following formula (I):

$$R^1_a Z X_b \quad (I)$$

[wherein $R^1$ is independently selected from the group consisting of an alkyl group having a carbon number of 1 to 20, a cycloalkyl group having a carbon number of 3 to 20, an aryl group having a carbon number of 6 to 20 and an aralkyl group having a carbon number of 7 to 20 ; Z is tin or silicon; X is independently chlorine or bromine; a is 0-3 and b is 1-4 provided that a +b =4].

13. A rubber composition according to claim 10, wherein the nitrogen-containing functional group is selected from the group consisting of a substituted amino group represented by the following formula (II):

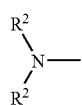

(II)

[wherein $R^2$ is independently an alkyl group having a carbon number of 1 to 12, a cycloalkyl group or an aralkyl group] and a cyclic amino group represented by the following formula (III):

(III)

[wherein $R^3$ is an alkylene group having 3-16 methylene groups, a substituted alkylene group, an oxyalkylene group or an N-alkylamino-alkylene group].

14. A rubber composition according to claim 10, wherein the silicon-containing functional group is a functional group derived from a hydrocarbyloxy silane.

15. A rubber composition according to claim 1, wherein the polymer (B) has a weight average molecular weight as measured without terminating by modification through a gel permeation chromatography and converted to polystyrene of not less than 20,000 but less than 150,000.

16. A rubber composition according to claim 15, wherein the polymer (B) has a weight average molecular weight as measured without terminating by modification through a gel permeation chromatography and converted to polystyrene of 50,000 to 120,000.

17. A rubber composition according to claim 3, wherein the polymer (B) has a weight average molecular weight as measured without terminating by modification through a gel permeation chromatography and converted to polystyrene of 2,000 to 30,000.

18. A rubber composition according to claim 4, wherein the polymer (B) has a weight average molecular weight as measured without terminating by modification through a gel permeation chromatography and converted to polystyrene of 50,000 to 120,000.

19. A rubber composition according to claim 1, which further contains 20 to 100 parts by mass of the filler (C) based on 100 parts by mass of the rubber component (A).

20. A rubber composition according to claim 19, which contains 30 to 90 parts by mass of the filler (C) based on 100 parts by mass of the rubber component (A).

21. A rubber composition according to claim 1, wherein the filler (C) is carbon black and/or silica.

22. A rubber composition according to claim 1, which contains not less than 10 parts by mass of silica based on 100 parts by mass of the rubber component (A).

23. A rubber composition according to claim 1, wherein the rubber component (A) comprises at least one selected from the group consisting of an aromatic vinyl compound-conjugated diene compound copolymer (D), a conjugated diene compound polymer (E) and natural rubber.

24. A rubber composition according to claim 23, wherein the aromatic vinyl compound-conjugated diene compound copolymer (D) is a styrene-butadiene copolymer.

25. A rubber composition according to claim 23, wherein the conjugated diene compound polymer (E) is a butadiene homopolymer.

26. A rubber composition according to claim 23, wherein each of the aromatic vinyl compound-conjugated diene compound copolymer (D) and the conjugated diene compound polymer (E) has at least one functional group.

27. A rubber composition according to claim 26, wherein the functional group in the aromatic vinyl compound-conjugated diene compound copolymer (D) and the conjugated diene compound polymer (E) is at least one selected from the group consisting of a tin-containing functional group, a silicon-containing functional group and a nitrogen-containing functional group.

28. A rubber composition according to claim 1, wherein a total amount of the polymer (B) and a softening agent (F) compounded is 5 to 80 parts by mass based on 100 parts by mass of the rubber component (A).

29. A rubber composition according to claim 28, wherein the total amount of the polymer (B) and the softening agent (F) compounded is 5 to 60 parts by mass based on 100 parts by mass of the rubber component (A).

30. A rubber composition according to claim 28, wherein a proportion of the polymer (B) in total of the polymer (B) and the softening agent (F) is not less than 20% by mass.

31. A rubber composition according to claim 2, wherein a bubble fraction in the rubber composition is 5 to 35%.

32. A rubber composition according to claim 31, which further contains a foaming agent (G) into the rubber component (A).

33. A rubber composition according to claim 32, which is formed by vulcanizing and foaming after compounded with 1 to 20 parts by mass of the foaming agent (G) based on 100 parts by mass of the rubber component (A).

34. A rubber composition according to claim 32, wherein the foaming agent (G) is at least one selected from the group consisting of azodicarbonamide, dinitrosopenta-methylene-tetramine, azobisisobutylonitrile, toluenesulfonyl hydrazide and a toluenesulfonyl hydrazide derivative.

35. A rubber composition according to claim 1, which is a rubber composition for a tire.

36. A pneumatic tire characterized by using a rubber composition as claimed in claim 35 in a tire member.

37. A pneumatic tire according to claim 36, wherein the tire member is at least one selected from the group consisting of a tread portion, a sidewall portion, a bead filler portion, a body ply skim portion and a reinforcing rubber portion for a run-flat tire.

38. A pneumatic tire characterized by using a rubber composition as claimed in claim 36 in at least a ground contact region of a tread portion.

39. A pneumatic tire according to claim 38, which is a studless tire.

40. A pneumatic tire according to claim 39, which is a studless tire for a passenger car.

* * * * *